(12) United States Patent
Jeong et al.

(10) Patent No.: US 12,484,087 B2
(45) Date of Patent: Nov. 25, 2025

(54) CHANNEL ACCESS PROCEDURE FOR SL TRANSMISSION OVER UNLICENSED BAND

(71) Applicant: Samsung Electronics Co., Ltd., Suwon-si (KR)

(72) Inventors: Kyeongin Jeong, Allen, TX (US); Hongbo Si, Plano, TX (US); Emad N. Farag, Flanders, NJ (US); Nishithkumar D. Tripathi, Parker, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 17/806,713

(22) Filed: Jun. 13, 2022

(65) Prior Publication Data

US 2023/0032652 A1 Feb. 2, 2023

Related U.S. Application Data

(60) Provisional application No. 63/227,904, filed on Jul. 30, 2021, provisional application No. 63/221,398, filed on Jul. 13, 2021.

(51) Int. Cl.
| | |
|---|---|
| H04W 74/08 | (2024.01) |
| H04W 72/04 | (2023.01) |
| H04W 72/0446 | (2023.01) |
| H04W 72/12 | (2023.01) |
| H04W 72/1263 | (2023.01) |

(Continued)

(52) U.S. Cl.
CPC ... H04W 74/0816 (2013.01); H04W 72/0446 (2013.01); H04W 72/1263 (2013.01); H04W 72/56 (2023.01); H04W 74/0866 (2013.01); H04W 92/18 (2013.01)

(58) Field of Classification Search
CPC ............ H04W 72/56; H04W 72/0446; H04W 72/1263; H04W 74/0866; H04W 92/18
See application file for complete search history.

(56) References Cited

U.S. PATENT DOCUMENTS 11,832,308 B2 * 11/2023 Agiwal ............... H04W 74/085
2017/0311254 A1 * 10/2017 Ly ..................... H04W 28/0278
(Continued)

FOREIGN PATENT DOCUMENTS

BR  122023025735 A2 *  5/2024
EP  3843475 A1  6/2021
(Continued)

OTHER PUBLICATIONS

Provisional Patent For the Lei Patent Document (Year: 2020).*
International Search Report and Written Opinion issued Oct. 14, 2022 regarding International Application No. PCT/KR2022/010053, 7 pages.
(Continued)

Primary Examiner — Sai Aung

(57) ABSTRACT

Methods and apparatuses for a channel access in a wireless communication systems. A method of a UE in a wireless communication system, the method comprising: determining whether, for a first time duration, a channel is sensed as an idle state for a channel access procedure; occupying the channel for a second time duration based on a determination that the channel is sensed as the idle state; and transmitting, for at least a portion of the second time duration, a signal on the channel, wherein the first time duration and the second time duration are based on a SL PPPP for a SL communication.

16 Claims, 15 Drawing Sheets

(51) Int. Cl.
*H04W 72/56* (2023.01)
*H04W 74/0816* (2024.01)
*H04W 92/18* (2009.01)

(56) References Cited

U.S. PATENT DOCUMENTS

| | | | | |
|---|---|---|---|---|
| 2019/0166627 A1* | 5/2019 | Takeda | ............. | H04W 74/0841 |
| 2019/0268946 A1* | 8/2019 | Harada | ................ | H04W 74/08 |
| 2019/0274054 A1 | 9/2019 | Salem | | |
| 2020/0113011 A1* | 4/2020 | Peisa | .................... | H04W 48/12 |
| 2020/0236681 A1* | 7/2020 | Chen | .................... | H04W 72/30 |
| 2020/0288432 A1 | 9/2020 | Min et al. | | |
| 2021/0120594 A1* | 4/2021 | Lei | .................... | H04W 74/0833 |
| 2021/0168861 A1 | 6/2021 | Lee et al. | | |
| 2021/0329472 A1* | 10/2021 | Xie | ....................... | H04W 48/14 |
| 2022/0104109 A1* | 3/2022 | Lei | ....................... | H04W 48/14 |

FOREIGN PATENT DOCUMENTS

| | | | | |
|---|---|---|---|---|
| WO | 2018048642 A1 | 3/2018 | | |
| WO | WO-2018039974 A1 * | 3/2018 | ............ | H04W 72/04 |

OTHER PUBLICATIONS

"3rd Generation Partnership Project; Technical Specification Group Radio Access Network; NR; Physical channels and modulation (Release 17)", 3GPP TS 38.211 V17.1.0, Mar. 2022, 135 pages.
"3rd Generation Partnership Project; Technical Specification Group Radio Access Network; NR; Multiplexing and channel coding (Release 17)", 3GPP TS 38.212 V17.1.0, Mar. 2022, 197 pages.
"3rd Generation Partnership Project; Technical Specification Group Radio Access Network; NR; Physical layer procedures for control (Release 17)", 3GPP TS 38.213 V17.1.0, Mar. 2022, 245 pages,.
"3rd Generation Partnership Project; Technical Specification Group Radio Access Network; NR; Physical layer procedures for data (Release 17)", 3GPP TS 38.214 V17.1.0, Mar. 2022, 225 pages.
"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.
"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.
"LTE; Evolved Universal Terrestrial Radio Access (E-UTRA); Physical layer procedures (3GPP TS 36.213 version 17.1.0 Release 17)", ETSI TS 136 213 V17.1.0, May 2022, 586 pages.

* cited by examiner

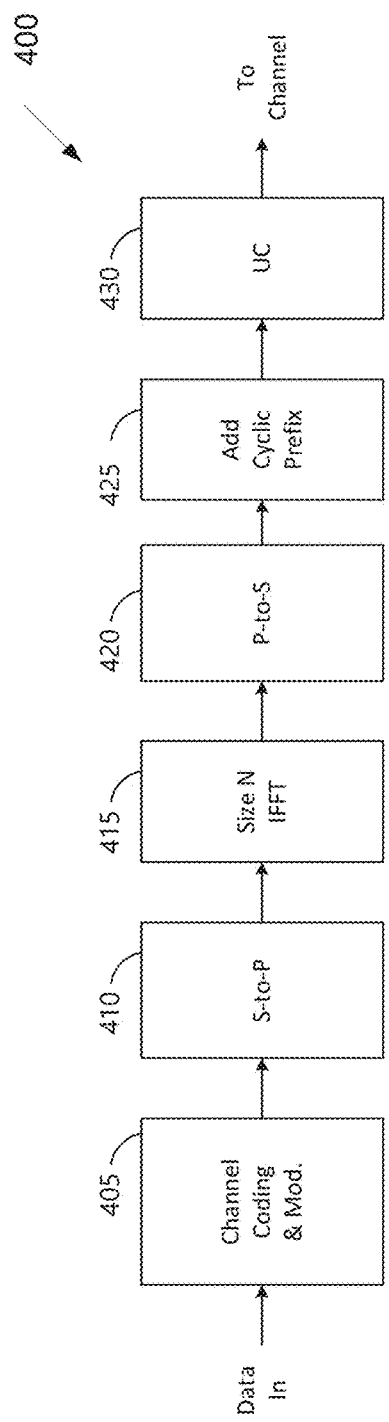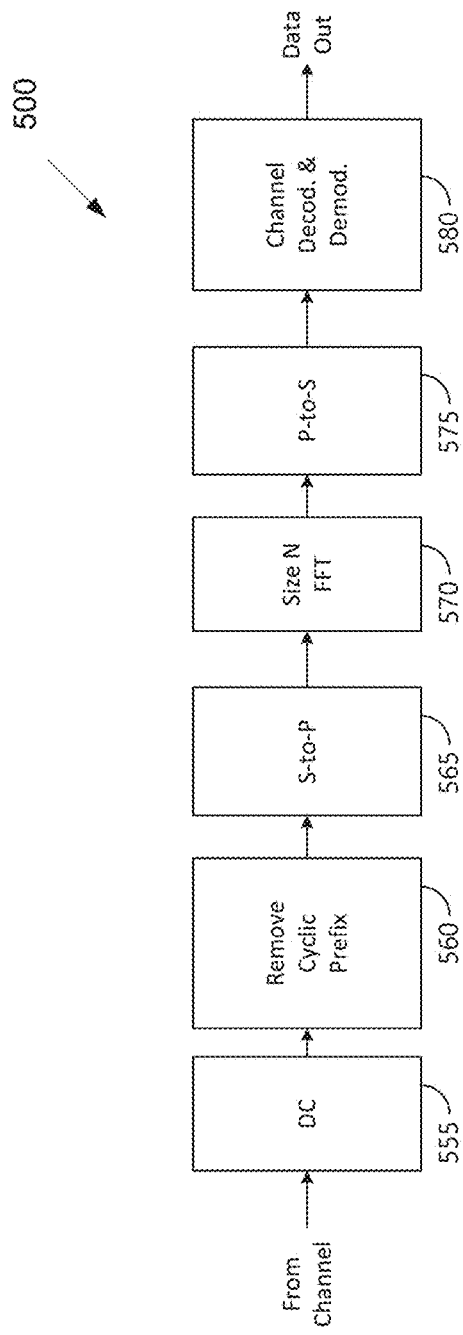
FIG. 4
FIG. 5

CHANNEL ACCESS PROCEDURE FOR SL TRANSMISSION OVER UNLICENSED BAND

CROSS-REFERENCE TO RELATED APPLICATIONS AND CLAIM OF PRIORITY

The present application claims priority to U.S. Provisional Patent Application No. 63/221,398, filed on Jul. 13, 2021, and U.S. Provisional Patent Application No. 63/227,904, filed on Jul. 30, 2021. The content of the above-identified patent document is incorporated herein by reference.

TECHNICAL FIELD

The present disclosure relates generally to wireless communication systems and, more specifically, the present disclosure relates to a channel access procedure for sidelink (SL) transmission over an unlicensed band in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a channel access procedure for SL transmission over an unlicensed band in a wireless communication system.

In one embodiment, a user equipment (UE) in a wireless communication system is provided. The UE comprises a processor configured to: determine whether, for a first time duration, a channel is sensed as an idle state for a channel access procedure, and occupy the channel, for a second time duration, based on a determination that the channel is sensed as the idle state. The UE further comprises a transceiver operably coupled to the processor, the transceiver configured to transmit, for at least a portion of the second time duration, a signal on the channel, wherein the first time duration and the second time duration are based on a SL ProSe per packet priority (PPPP) for a SL communication.

In another embodiment, a base station (BS) in a wireless communication system is provided. The BS comprises a processor and a transceiver operably coupled to the processor, the transceiver configured to receive, for at least a portion of a second time duration, a signal on a channel, wherein: the channel is sensed and determined whether, for a first time duration, the channel is sensed as an idle state for a channel access procedure, the channel is occupied, for the second time duration, based on a determination that the channel is sensed as the idle state, and the first time duration and the second time duration are based on a SL PPPP for a SL communication.

In yet another embodiment, a method of a UE in a wireless communication system is provided. The method comprises: determining whether, for a first time duration, a channel is sensed as an idle state for a channel access procedure; occupying the channel for a second time duration based on a determination that the channel is sensed as the idle state; and transmitting, for at least a portion of the second time duration, a signal on the channel, wherein the first time duration and the second time duration are based on a SL PPPP for a SL communication.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate an example of wireless transmit and receive paths according to various embodiments of the present disclosure;

DETAILED DESCRIPTION

FIG. 1 through FIG. 16, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.17.1.0, "Physical channels and modulation"; 3GPP TS 38.212 v.17.1.0, "Multiplexing and channel coding"; 3GPP TS 38.213 v17.1.0, "NR; Physical Layer Procedures for Control"; 3GPP TS 38.214: v.17.1.0, "Physical layer procedures for data"; 3GPP TS 38.321 v17.0.0, "Medium Access Control (MAC) protocol specification"; 3GPP TS 38.331 v.17.0.0, "Radio Resource Control (RRC) protocol specification"; and 3GPP TS 36.213 v17.1.0, "Evolved Universal Terrestrial Radio Access (E-UTRA); Physical layer."

Figure 1:
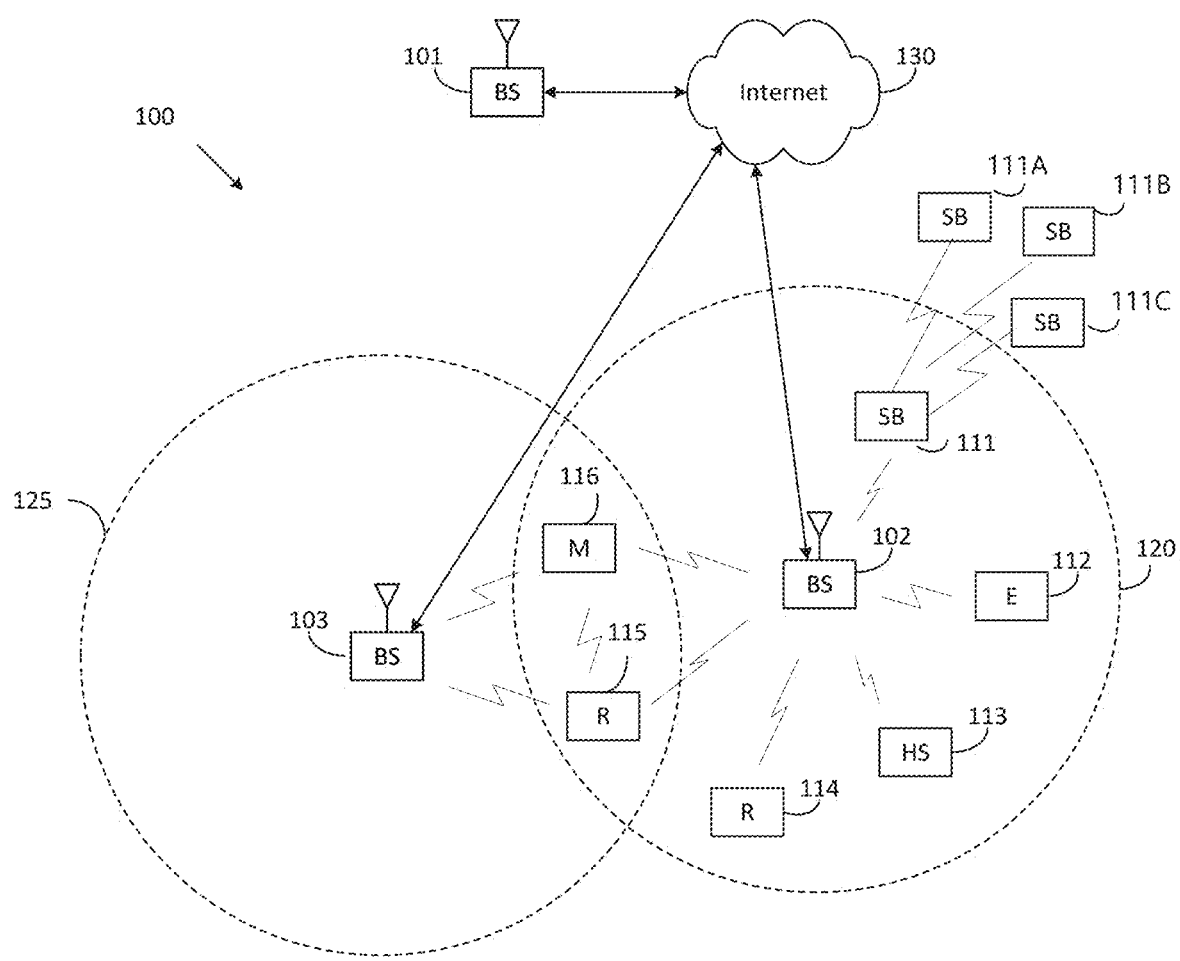
FIG. 1 illustrates an example of wireless network according to various embodiments of the present disclosure.
Figure 2:
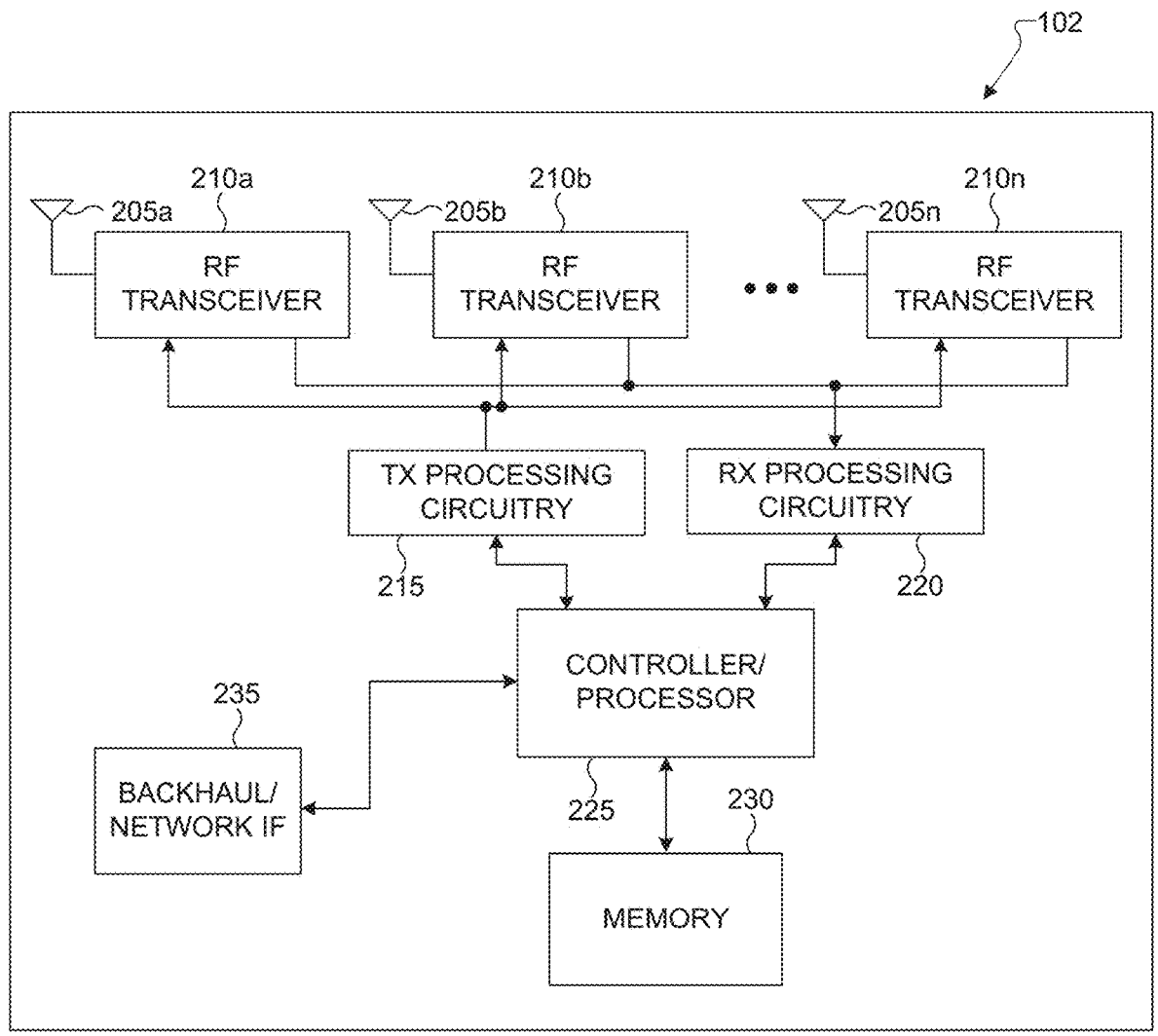
FIG. 2 illustrates an example of gNB according to various embodiments of the present disclosure.
Figure 3:
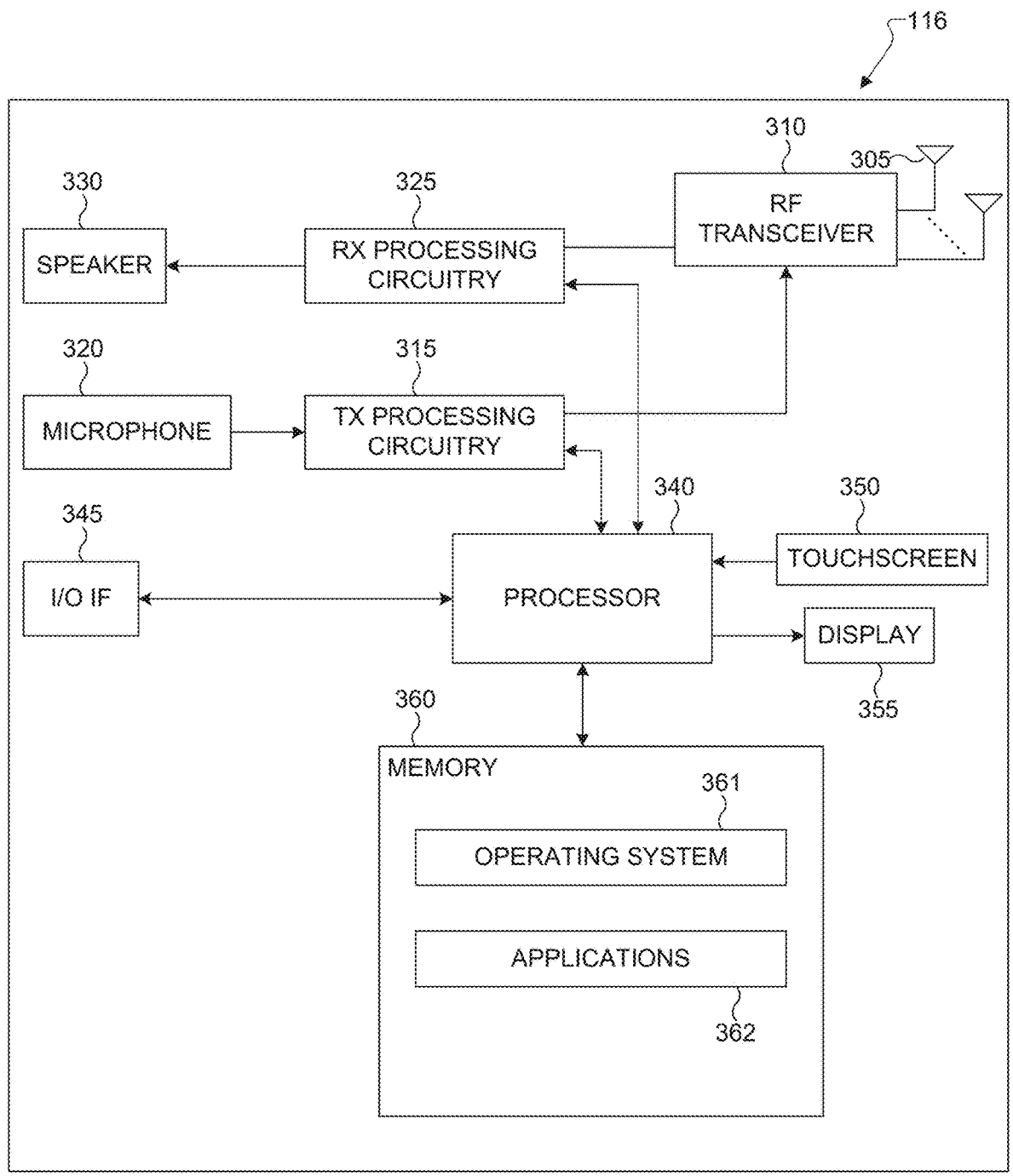
FIG. 3 illustrates an example of UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example of wireless network according to embodiments of the present disclosure. The embodiment of the wireless network shown in FIG. 1 is for illustration only. Other embodiments of the wireless network 100 could be used without departing from the scope of this present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In various embodiments, a UE 116 may communicate with another UE 115 via a sidelink (SL). For example, both UEs 115-116 can be within network coverage (of the same or different base stations). In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a channel access procedure for SL transmission over an unlicensed band in a wireless communication system. In certain embodiments, and one or more of the gNBs 101-103 includes circuitry, programing, or a combination thereof, for a channel access procedure for SL transmission over an unlicensed band in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs (e.g., via a Uu interface or air interface, which is an interface between a UE and 5G radio access network (RAN)) and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., SB 111A to 111C) that may have a SL communication with the SB 111. The SB 111 can communicate directly with the SBs 111A to 111C through a set of SLs (e.g., SL interfaces) to provide sideline communication, for example, in situations where the SBs 111A to 111C are remotely located or otherwise in need of facilitation for network access connections (e.g., BS 102) beyond or in addition to traditional fronthaul and/or backhaul connections/interfaces. In one example, the SB 111 can have direct communication, through the SL communication, with SBs 111A to 111C with or without support by the BS 102. Various of the UEs (e.g., as depicted by UEs 112 to 116) may be capable of one or more communication with their other UEs (such as UEs 111A to 111C as for SB 111).

FIG. 2 illustrates an example of gNB 102 according to embodiments of the present present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a channel access procedure for SL transmission over an unlicensed band in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example of UE 116 according to embodiments of the present present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100 or by other UEs (e.g., one or more of UEs 111-115) on a SL channel. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink and/or sidelink channel signals and the transmission of uplink and/or sidelink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a channel access procedure for SL transmission over an unlicensed band in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points and a sidelink (SL) that refers to transmissions from one or more UEs to one or more UEs.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

FIG. 4 and FIG. 5 illustrate examples of wireless transmit and receive paths according to this present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support SL measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

This present disclosure provides mechanisms to enable a suitable network entity such as a self organizing network (SON) to manage the transmission of the on-demand system information (ODSI). In particular, the UE and/or the gNB record(s) relevant information and provide(s) such information to a network entity (e.g., the gNB or the SON/MDT entity). The network entity makes use of such information to modify ODSI related operational parameters such as random-access parameters for the ODSI and determine to broadcast or not broadcast suitable SIB(s). The network entity (e.g., SON/MDT) can also decide the type of transmission such as broadcast signaling or dedicated signaling.

Without a suitable ODSI optimization operation, radio resources may be wasted. Furthermore, in case of increased failures, the SI acquisition may be delayed, potentially affecting other operations such as increased access delay.

Figure 6:
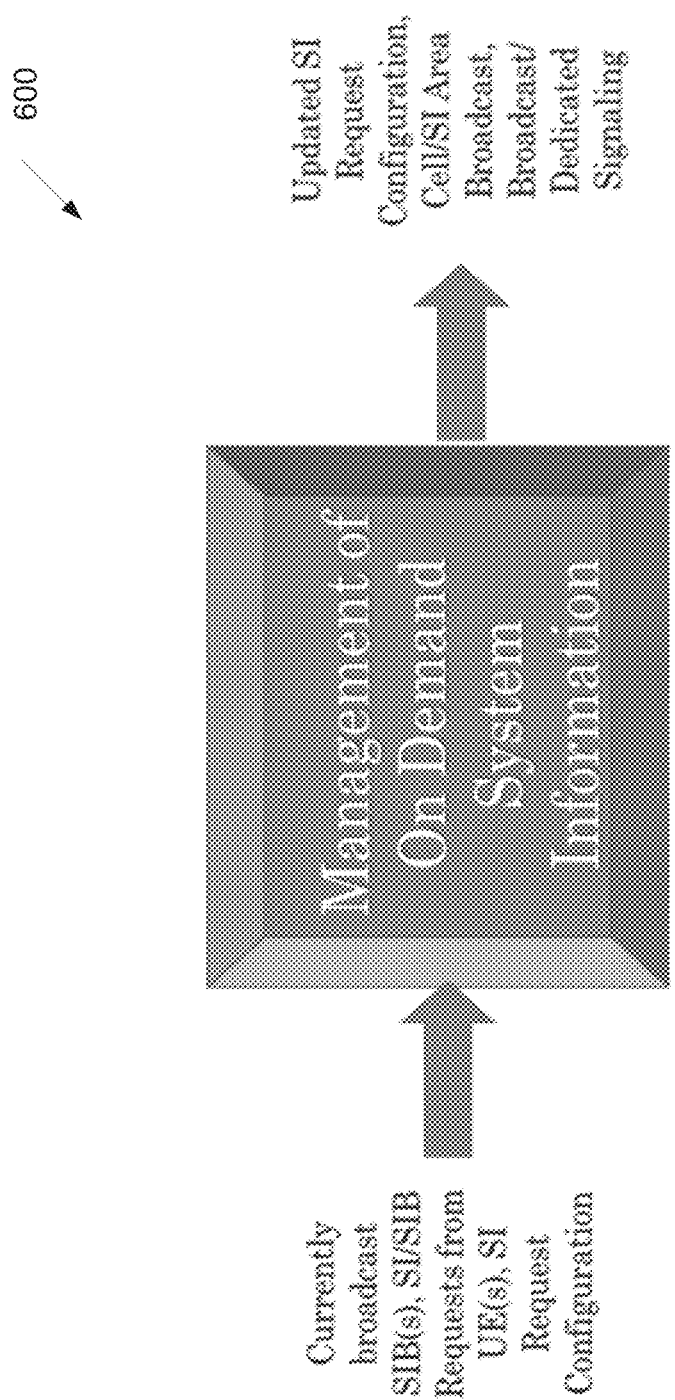
FIG. 6 illustrates an example of mechanism for ODSI management according to various embodiments of the present disclosure.

FIG. 6 illustrates an example of mechanism 600 for ODSI management according to various embodiments of the present disclosure. An embodiment of the mechanism 600 shown in FIG. 6 is for illustration only.

As illustrated in FIG. 6, the gNB considers factors such as currently broadcast SIB(s), SI/SIB requests from UE(s), and SI request configuration. The gNB, in one example, determines updated SI request configuration, a cell/SI area broadcast area for a given SIB/SI (e.g., cell-level or SI area-level), and a type of signaling for conveying SI/SIB(s) to the UE (e.g., broadcast signaling vs. dedicated signaling).

Figure 7:
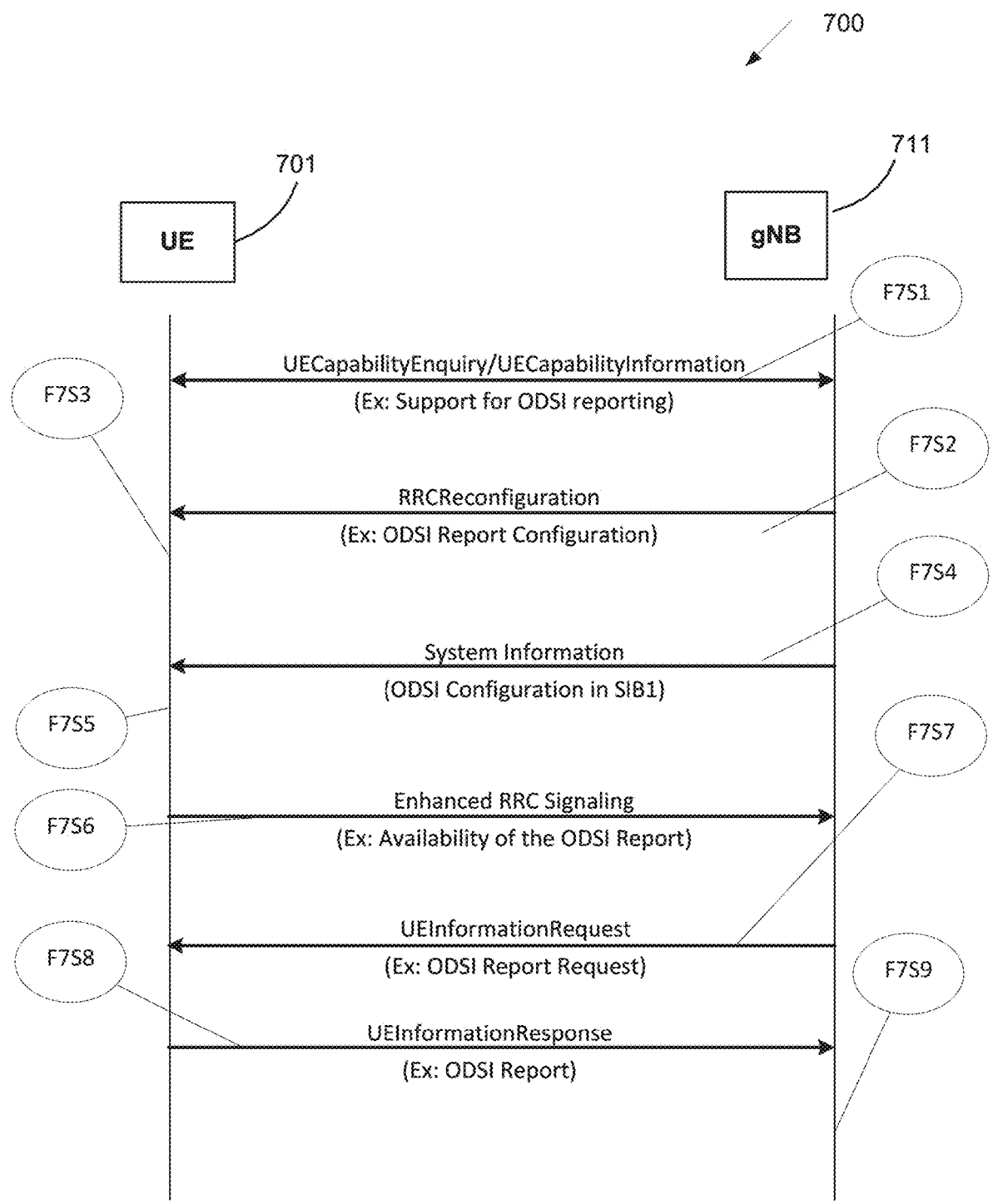
FIG. 7 illustrates an example of UE-network signaling procedures for ODSI management according to various embodiments of the present disclosure.

FIG. 7 illustrates an example of UE-network signaling procedures 700 for ODSI management according to various embodiments of the present disclosure. The UE-network signaling procedures 700 as may be performed by a UE (e.g., 111-116 as illustrated in FIG. 1) and a BS (e.g., 101-103 as illustrated in FIG. 1). An embodiment of the UE-network signaling procedures 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

FIG. 7 illustrates the overall UE-network signaling procedure to illustrate example embodiments of the present disclosure in support of the ODSI management.

As illustrated in FIG. 7, in Step F7S1, the gNB and the UE exchange UECapabilityEnquiry/UECapabilityInformation messages so that the UE can convey the UE's support for ODSI reporting. In one example, the UE supports ODSI reporting per specifications without the need for ODSI reporting related UE capability exchange.

In Step F7S2, the gNB configures the UE for ODSI reporting by sending an RRC signaling message such as the RRCReconfiguration message.

In Step F7S3, the UE records the ODSI recording and reporting configuration.

In Step F7S4, the gNB provides ODSI configuration in SIB1. For example, the gNB specifies the mapping between the SI and associated SIB(s) and whether a given SI message is being broadcast (i.e., si-BroadcastStatus="broadcasting" in SchedulingInfo IE) or not (i.e., si-BroadcastStatus="notBroadcasting in SchedulingInfo IE). The gNB also specifies the granularity of the SI broadcast: cell-level or SI area level. For example, if an SI message is being broadcast in a given SI area, the identity of such area is specified as systemInformationAreaID in SI-SchedulingInfo IE. Furthermore, in support of msg1-based ODSI requests, the gNB specifies random access resources for ODSI in the IE si-RequestConfig for the normal uplink (NUL) and si-RequestConfigSUL for the Supplementary Uplink (SUL).

Figure 8:
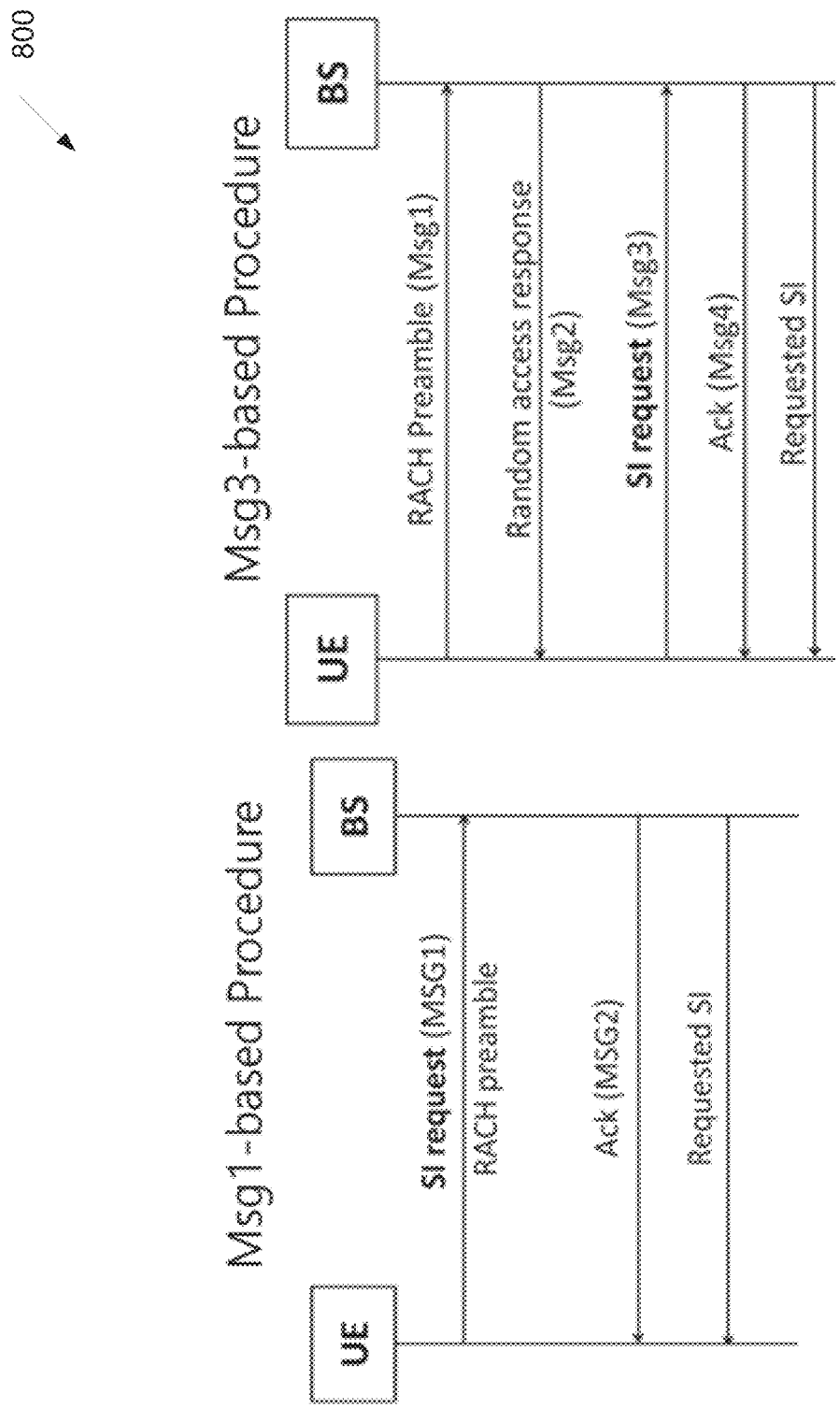
FIG. 8 illustrates an example of msg1-based and msg3-based ODSI request procedures according to various embodiments of the present disclosure.

In Step F7S5, the UE processes the received ODSI related configuration. If the UE needs a SIB that is not being broadcast in an SI message, the UE carries out msg1-based or msg3-based random access procedure as shown in FIG. 8 below.

In Step F7S5, the UE records suitable information to facilitate optimization of the ODSI retrieval procedure.

In Step F7S5, the UE creates an ODSI report by observing ODSI request successes and failures.

In Step F7S5, the UE indicates whether the UE used supplementary uplink (SUL) or the normal uplink (NUL) for the ODSI. This information enables the SON to identify where the problem/optimization opportunity resides: in SUL only, NUL only, or both SUL and NUL.

In Step F7S5, the UE includes in the UE's ODSI report an indication of whether NUL was selected due to the absence of the SUL configuration (i.e., no specification of the IE si-RequestConfigSUL by the gNB) or due to the RSRP criterion not being met. There are different examples for such indication.

In one example, the absence of an SUL related flag can imply that the UE has selected the NUL because of the absence of the SUL configuration. The presence of the flag "nulSelected-SUL" and the value of 1 or true can imply that the UE has selected the NUL because the RSRP criterion for the SUL selection is not met. The value of the "nulSelected-SUL" flag as 0 or false can imply that the UE has selected the SUL, because the RSRP criterion for the SUL is met.

In another example, the absence of the RSRP value in the report implies the election of the NUL due to the absence of the SUL configuration, and the RSRP value (with or without the RSRP threshold specified by the gNB) can be used to determine whether the NUL/SUL was selected due to the RSRP criterion being met or not. Based on relative occurrence of success and failures, the SON/MDT entity can adjust the RSRP threshold for the SUL/NUL selection to enhance the ODSI request procedure.

In Step F7S5, the UE includes in the UE's ODSI report full or partial configuration specified in one or both of these IEs: "si-RequestConfigSUL" and "SI-RequestConfig."

In one embodiment of the present disclosure, the gNB includes in the gNB's UE-specific ODSI report full or partial configuration from one or both of these IEs: "si-RequestConfigSUL" and "si-RequestConfig." In one example, the partial configuration recorded by the UE and/or the gNB includes the number of PRACH preamble(s) and the PRACH resource(s) configured for the ODSI request. In one example, parameters are fully specified. In another example, bitmaps are used to convey parameter settings.

In Step F7S5, in one example, the UE includes in the UE's ODSI report information regarding the occurrence of cell reselection prior to the reception of the acknowledgment to the SI Request for msg1-based and msg3-based ODSI procedures. This information leads to proper recording of successes, failures, and attempts.

In one example, a flag such as cellReselectionIndicator=1 (if the flag has occurred) can be used. The absence of this parameter can imply that the cell reselection did not occur during the ODSI procedure. In another example, the specification can dictate that the UE does not consider such event as the failure and hence does not record such lack of successful completion of the procedure as a failure in the UE's ODSI report. Furthermore, the UE can be dictated not to consider such event as an ODSI attempt because the ODSI procedure was not completed and because the ODSI attempt may not count toward statistics of successes, failures, and attempts.

In Step F7S5, the ODSI-related information is not recorded at all in the ODSI report when cell reselection occurs. In another example, the ODSI-related information is recorded, and the cell reselection indication is specified as mentioned herein.

The knowledge about the cell reselection may enable SON to determine whether any optimization is really needed or not. If absence of the acknowledgement to the ODSI request is due to cell reselection, this "failure" is not a true failure. In contrast, if a cell reselection has not occurred but the acknowledgment is absent, this failure information is relevant and hence can be used for ODSI optimization.

In Step F7S5, in one example, the UE records the desired SIBs in the IE "requested-SIB-List" (that are not currently being broadcast by the gNB) using a bitmap (e.g., a 16-bit or 24-bit bitmap). Furthermore, the UE starts recording the requested SIB(s) starting with SIB2 instead of SIB1. For example, position 0 (i.e., the Least Significant Bit or LSB) indicates if 0+2=SIB2 is being requested by the UE or not. Similarly, Position (N-1) (i.e., Most Significant Bit or MSB) indicates if (N-1)+2=SIB (N+1) is being requested by the UE or not. The bit value can be set to 1 (or 0) to indicate that the related SIB is being requested.

In Step F7S5, in one example, the UE records an explicit or implicit indication of whether the desired SI (i.e., the SI containing one or more desired SIBs) or the desired SIB is being broadcast per cell or per SI area. In one example, an explicit indication is a flag such as "cellOrSIAreaBroadcast." In one example, an implicit indication is the presence or absence of the systemInformationAreaID in the ODSI report. In one example if the SI area is being specified by the gNB in the SI message and the UE needs a SIB (that is not broadcast), the UE records systemInformationAreaID in the ODSI report. In another example, the gNB records systemInformationAreaID as well.

The knowledge of the cell or SI are broadcast enables the SON/MDT entity to determine whether to broadcast relevant SIB s in the SI Area or the cell while meeting the coordination requirement at the SI Area level). In another alternative, the SON/MDT entity can change from one mode to another (e.g., change the broadcast from the SI Area level to the cell level.)

In Step F7S5, in one example, the UE keeps the count of the total number of successes, failures, and/or attempts for ODSI retrieval for both msg1-based ODSI and msg3-based ODSI per requested SIB. If only a limited number of reports is stored or only the most recent report is stored (e.g., like a connection establishment failure (CEF) report), the SON/MDT entity may not know the full extent of the problem. Such recording and reporting by the UE enable the SON/MDT entity to accurately calculate the success/failure rate.

In Step F7S5, in one example, to save memory and/or reduce the message size, the UE reports a maximum of "full" or "compact" maxODSIReports. In one example, the UE stores the latest reports up to the limit of maxODSIReports. In another, to save the processing power, after the limit of maxODSIReports is reached, the UE does not overwrite old ODSI reports by new ODSI reports.

In Step F7S5, in one example, to save memory and/or reduce the message size, the UE adds a new full/compact report if the UE's location is at least "threshold" distance away from the location(s) of all currently stored reports.

In Step F7S5, in one example, to save memory and/or reduce the message size, the UE records a compact location by skipping the velocity IE instead of the full location IE (that includes velocity). In one example, the UE includes the full or compact location IE if the location accuracy exceeds a threshold (i.e., the UE does not include actual location accuracy, which is typically present in the location IE). In another example, the UE includes an indicator to indicate if accuracy is greater than a threshold or not instead of specifying the exact location accuracy value.

In Step F7S5, for the msg3-based ODSI procedure, the UE records the identification of the instant in the message sequence (or the event) when the ODSI failure occurs. Examples of such instants or events include (i) whether the failure occurred before or after the UE has transmitted msg3, (ii) whether msg3 was transmitted or not, and (iii) whether the acknowledgment to msg3 was received or not. In another example, the UE also records measurements of the serving cell (e.g., one or more beams) and the neighbor cells. In yet another example, only the neighbor cells that exceed a threshold or that are within X dB of the serving cell are recorded and reported.

In one example, a limit on the maximum number of neighbor cells (e.g., Nmax) for reporting is specified. The recording and reporting such instants or events enable the SON/MDT entity to determine whether to optimize RA parameters, do RF optimization or do both RA and RF optimization.

In Step F7S5, in one example, the UE records and reports all the desired SIBs including the ones that are currently being broadcast and the ones that are not currently broadcast (which may be requested via the ODSI request procedure) for successful and failed ODSI request procedures. Such information enables the SON/MDT entity to eliminate unnecessary broadcast of SIB(s). The SON/MDT can also determine what SIB(s) to broadcast at the cell level and what SIB(s) to broadcast at the SI Area level.

In Step F7S6, the UE informs the gNB about the availability of the ODSI report in an enhanced RRC signaling message. In one example, the UE includes "odsi-Report" IE in an RRC message. Examples of RRC messages that include such new IE about the ODSI report availability include "RRC Complete" messages such as RRC setup complete, RRC resume complete, and RRC reestablish complete, and RRC reconfiguration complete and measurement report message.

In Step F7S7, the gNB requests the UE to provide the ODSI report by including an IE such as "odsi-ReportRequest" in the UEInformationRequest message.

In Step F7S8, the UE sends the ODSI report in the UEInformationResponse message in response to receiving the UEInformationRequest message.

In Step F7S9, the gNB conveys to the SON/MDT entity the information that the gNB has collected about the UE's ODSI request along with the information that the gNB has received from the UE in Step F7S8.

FIG. 8 illustrates an example of msg1-based and msg3-based ODSI request procedures 800 according to various embodiments of the present disclosure. The msg1-based and msg3-based ODSI request procedures 800 as may be performed by a UE (e.g., 111-116 as illustrated in FIG. 1) and a BS (e.g., 101-103 as illustrated in FIG. 1). An embodiment of the msg1-based and msg3-based ODSI request procedures 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In case of msg1-based procedure, the RACH preamble itself represents the SI request, and the UE utilizes a RACH preamble specified by the gNB for ODSI. In case of msg3-based procedure, the UE utilizes a contention-based RACH preamble and sends an SI request in the msg3.

Figure 9:
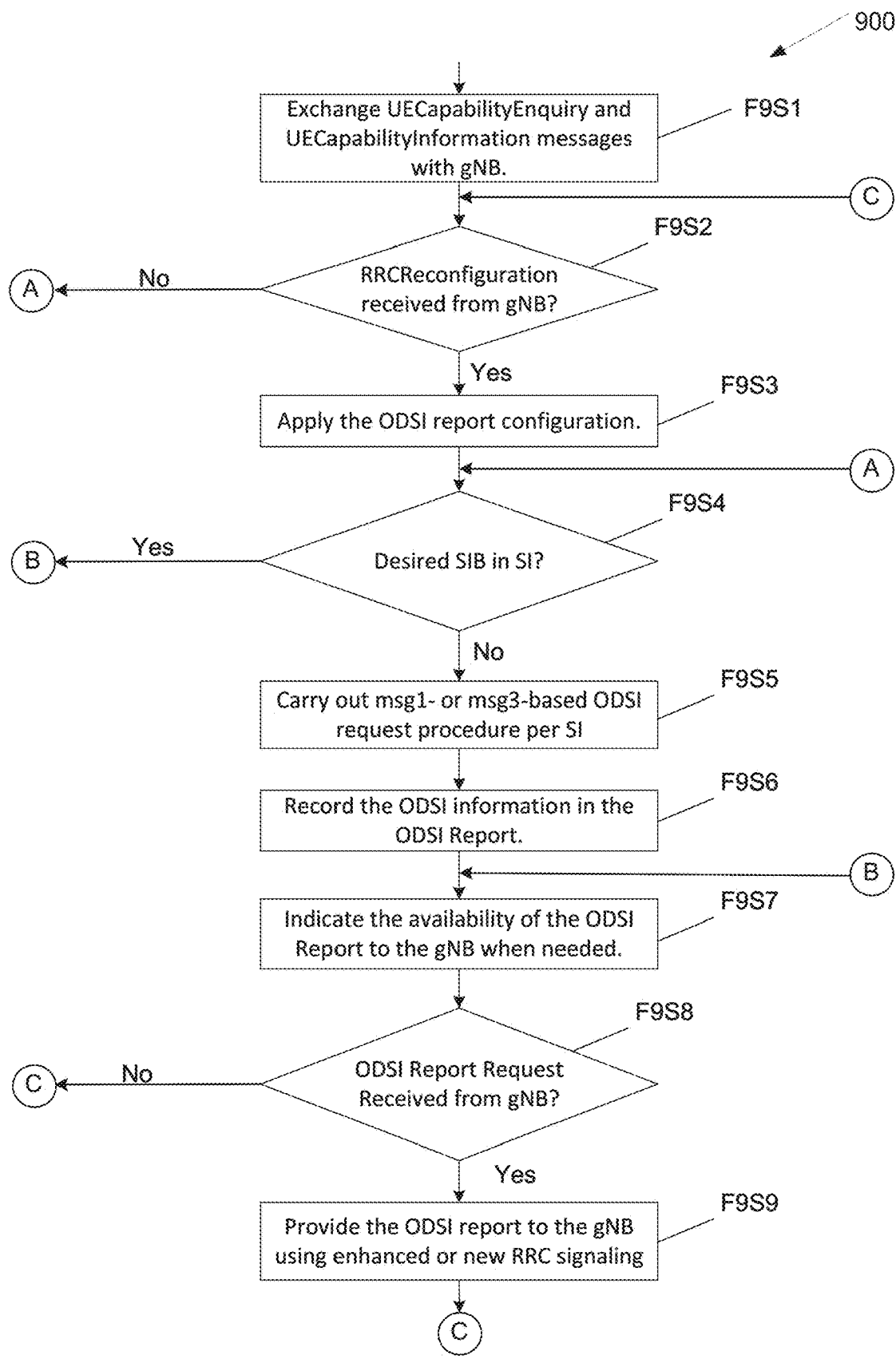
FIG. 9 illustrates a flowchart of UE procedure for ODSI management according to various embodiments of the present disclosure.

FIG. 9 illustrates a flowchart of UE procedure 900 for ODSI management according to various embodiments of the present disclosure. The UE procedure 900 as may be performed by a UE (e.g., 111-116 as illustrated in FIG. 1). An embodiment of the UE procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, in Step F9S1, the UE exchanges UECapabilityEnquiry and UECapabilityInformation messages with gNB. In one example, the UE specifies the UE's ODSI recording and reporting capabilities (e.g., maximum number of ODSI reports).

In Step F9S2, the UE checks if the UE has received RRCReconfiguration received from the gNB. If the UE has, the UE goes to Step F9S3. Otherwise, the UE goes to Step F9S4.

In Step F9S3, the UE applies the ODSI report configuration. This configuration includes parameters such as the number of ODSI reports, the maximum period for which the ODI report is kept by the UE, and specification of contents of ODSI report (e.g., full location IE vs. compact location IE and absence of velocity in the location IE).

In Step F9S4, the UE checks if the SI messages being broadcast by the gNB in the current cell contain all the SIB s that the UE needs. If the UE finds that all the required SIB s are being broadcast by the gNB, the UE goes to Step F9S7. If the UE finds that one or more of the required SIBs are not being broadcast by the gNB (i.e., si-BroadcastStatus="notBroadcasting in SchedulingInfo IE), the UE records ODSI related configuration such as si-RequestConfig and si-RequestConfigSUL and goes to Step F9S5. The UE also records systemInformationAreaID if the SIB that the UE requires is being broadcast per SI Area (instead of per cell).

In Step F9S5, the UE carries out msg1-based or msg3-based ODSI request procedure based on the SI message carrying SIB1.

In Step F9S6, the UE records the information relevant to the ODSI report.

In Step F9S6, the UE creates an ODSI report by observing ODSI request successes and failures.

In Step F9S6, the UE indicates whether the UE used supplementary uplink (SUL) or the normal uplink (NUL) for ODSI. This information enables the SON to identify where the problem/optimization opportunity resides in SUL only, NUL only, or both SUL and NUL.

In Step F9S6, in one example, the UE includes in the UE's ODSI report an indication of whether NUL was selected due to the absence of the SUL configuration (i.e., no specification of the IE si-RequestConfigSUL by the gNB) or due to the RSRP criterion not being met. There are different examples for such indication. In one example, the absence of an SUL related flag can imply that the UE has selected the NUL because of the absence of the SUL configuration. The presence of the flag "nulSelected-SUL" and the value of 1 or true can imply that the UE has selected the NUL because the RSRP criterion for the SUL selection is not met. The value of the "nulSelected-SUL" flag as 0 or false can imply that the UE has selected the SUL, because the RSRP criterion for the SUL is met.

In another example, the absence of the RSRP value in the report implies the election of the NUL due to the absence of the SUL configuration, and the RSRP value (with or without the RSRP threshold specified by the gNB) can be used to determine whether the NUL/SUL was selected due to the RSRP criterion being met or not. Based on relative occurrence of success and failures, the SON/MDT entity can adjust the RSRP threshold for the SUL/NUL selection to enhance the ODSI request procedure.

In Step F9S6, in one example, the UE includes in the UE's ODSI report full or partial configuration specified in one or both of these IEs: "si-RequestConfigSUL" and "SI-Request-Config." In another embodiment, the gNB includes in the gNB's UE-specific ODSI report full or partial configuration from one or both of these IEs: "si-RequestConfigSUL" and "si-RequestConfig." In one example, the partial configuration recorded by the UE and/or the gNB includes the number of PRACH preamble(s) and the PRACH resource(s) configured for the ODSI request. In one example, parameters are fully specified. In another example, bitmaps are used to convey parameter settings.

In Step F9S6, in one example, the UE includes in the UE's ODSI report information regarding the occurrence of cell reselection prior to the reception of the acknowledgment to the SI request for msg1-based and msg3-based ODSI procedures. This information leads to proper recording of successes, failures, and attempts. In one example, a flag such as cellReselectionIndicator=1 (if the flag has occurred) can be used. The absence of this parameter can imply that the cell reselection did not occur during the ODSI procedure.

In another example, the UE does not consider such event as the failure and hence does not record such lack of successful completion of the procedure as a failure in the UE's ODSI report. Furthermore, the UE can be dictated not to consider such event as an ODSI attempt because the ODSI procedure was not completed and because the ODSI attempts may not count toward statistics of successes, failures, and attempts.

In Step F9S6, the ODSI-related information is not recorded at all in the ODSI report when cell reselection occurs. In another example, the ODSI-related information is recorded, and the cell reselection indication is specified as mentioned herein.

The knowledge about the cell reselection may enable SON to determine whether any optimization is really needed or not. If absence of the acknowledgement to the ODSI request is due to cell reselection, this "failure" is not a true failure. In contrast, if a cell reselection has not occurred but the acknowledgment is absent, this failure information is relevant and hence can be used for ODSI optimization.

In Step F9S6, in one example, the UE records the desired SIBs in the IE "requested-SIB-List" (that are not currently being broadcast by the gNB) using a bitmap (e.g., a 16-bit or 24-bit bitmap). Furthermore, the UE starts recording the requested SIB(s) starting with SIB2 instead of SIB1. For example, position 0 (i.e., the Least significant bit or LSB) indicates if 0+2=51B2 is being requested by the UE or not. Similarly, position (N−1) (i.e., most significant bit or MSB) indicates if (N−1)+2=SIB (N+1) is being requested by the UE or not. The bit value can be set to 1 (or 0) to indicate that the related SIB is being requested.

In Step F9S6, in one example, the UE records an explicit or implicit indication of whether the desired SI (i.e., the SI containing one or more desired SIBs) or the desired SIB is being broadcast per cell or per SI area. In one example, an explicit indication is a flag such as "cellOrSIAreaBroadcast." In one example, an implicit indication is the presence or absence of the systemInformationAreaID in the ODSI report. In one example, if the SI area is being specified by the gNB in the SI message and the UE needs a SIB (that is not broadcast), the UE records systemInformationAreaID in the ODSI report. In another example, the gNB records systemInformationAreaID as well. The knowledge of the cell or SI are broadcast enables the SON/MDT entity to determine whether to broadcast relevant SIB s in the SI Area or the cell while meeting the coordination requirement at the SI Area level). In another alternative, the SON/MDT entity can change from one mode to another (e.g., change the broadcast from the SI Area level to the cell level.)

In Step F9S6, the UE keeps the count of the total number of successes, failures, and/or attempts for ODSI retrieval for both msg1-based ODSI and msg3-based ODSI per requested SIB. If only a limited number of reports is stored or only the most recent report is stored (e.g., like a CEF report), the SON/MDT entity may not know the full extent of the problem. Such recording and reporting by the UE enable the SON/MDT entity to accurately calculate the success/failure rate.

In Step F9S6, in one example, to save memory and/or reduce the message size, the UE reports a maximum of "full" or "compact" maxODSIReports. In one example, the UE stores the latest reports up to the limit of maxODSIReports. In another example, to save the processing power, after the limit of maxODSIReports is reached, the UE does not overwrite old ODSI reports by new ODSI reports.

In Step F9S6, in one example, to save memory and/or reduce the message size, the UE adds a new full/compact report if the UE's location is at least "threshold" distance away from the location(s) of all currently stored reports.

In Step F9S6, in one example, to save memory and/or reduce the message size, the UE records a compact location by skipping the velocity IE instead of the full location IE (that includes velocity). In one example, the UE includes the full or compact location IE if the location accuracy exceeds a threshold (i.e., the UE does not include actual location accuracy, which is typically present in the location IE). In another example, the UE includes an indicator to indicate if accuracy is greater than a threshold or not instead of specifying the exact location accuracy value.

In Step F9S6, in one example, for the msg3-based ODSI procedure, the UE records the identification of the instant in the message sequence (or the event) when the ODSI failure occurs. Examples of such instants or events include (i) whether the failure occurred before or after the UE has transmitted msg3, (ii) whether msg3 was transmitted or not, and (iii) whether the acknowledgment to msg3 was received or not. In one example, the UE also records measurements of the serving cell (e.g., one or more beams) and the neighbor cells. In yet another example, only the neighbor cells that exceed a threshold or that are within X dB of the serving cell are recorded and reported. In one example, a limit on the maximum number of neighbor cells (e.g., Nmax) for reporting is specified. The recording and reporting such instants or events enable the SON/MDT entity to determine whether to optimize RA parameters, do RF optimization or do both RA and RF optimization.

In Step F9S6, in one example, the UE records and reports all the desired SIBs including the ones that are currently being broadcast and the ones that are not currently broadcast (which may be requested via the ODSI request procedure) for successful and failed ODSI request procedures. Such information enables the SON/MDT entity to eliminate unnecessary broadcast of SIB(s). The SON/MDT can also determine what SIB(s) to broadcast at the cell level and what SIB(s) to broadcast at the SI Area level.

In Step F9S6, the UE creates a new ODSI report such that the report structure has new IEs that capture overall ODSI performance metrics such as number of successes and failures and IEs that reuse the existing IEs such as ra-Report IEs.

In Step F9S7, when an ODSI report is available, the UE informs the gNB about the availability of the ODSI report in an enhanced RRC signaling message. In one example, the UE includes "odsi-Report" IE in an RRC message. Examples of RRC messages that include such new IE about the ODSI report availability include "RRC complete" messages such as RRC setup complete, RRC resume complete, and RRC reestablish complete, and RRC reconfiguration complete and measurement report message.

In Step F9S8, the UE checks if the UE has received an ODSI report request from the gNB. If the UE has, the UE goes to Step F9S9. Otherwise, the UE goes to Step F9S2.

In Step F9S9, the UE provides the ODSI report to the gNB using RRC signaling (e.g., in an R16 message such as UEInformationResponse or a new RRC message). Then, the UE goes to Step F9S1.

Figure 10:
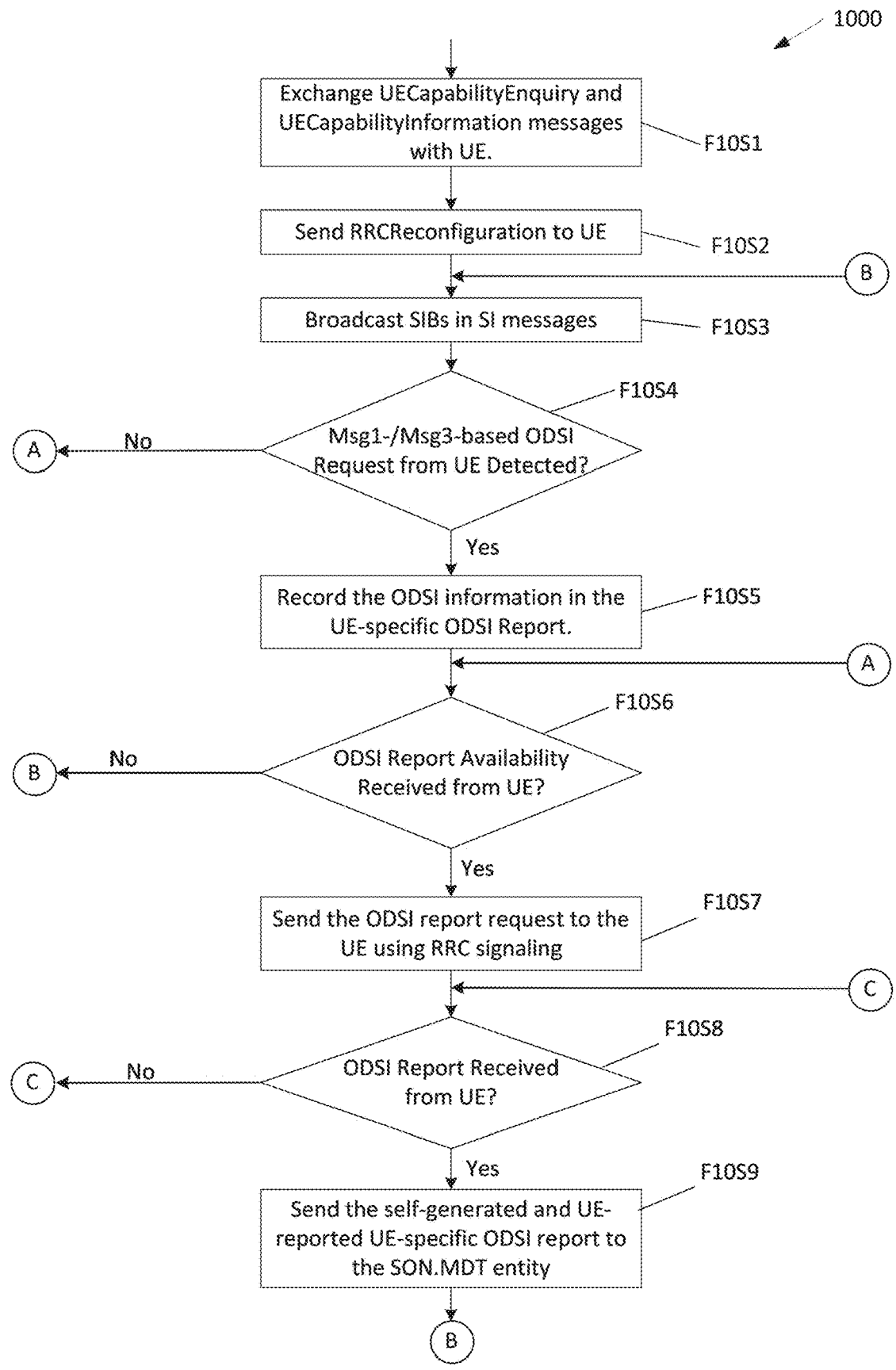
FIG. 10 illustrates a flowchart of gNB procedure for ODSI management according to various embodiments of the present disclosure.

FIG. 10 illustrates a flowchart of gNB procedure 1000 for ODSI management according to various embodiments of the present disclosure. The gNB procedure 1000 as may be performed by a BS (e.g., 101-103 as illustrated in FIG. 1). An embodiment of the gNB procedure 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In Step F10S1, the gNB exchanges UECapabilityEnquiry and UECapabilityInformation messages with the UE.

In Step F1052, the gNB sends RRCReconfiguration message to the UE to specify the ODSI recording and reporting configuration.

In Step F1052, the gNB broadcasts SIBs at the cell level or the SI Area level. The gNB provides ODSI configuration in SIB1. For example, the gNB specifies the mapping between the SI and associated SIB(s) and whether a given SI message is being broadcast (i.e., si-BroadcastStatus="broadcasting" in SchedulingInfo IE) or not (i.e., si-BroadcastStatus="notBroadcasting in SchedulingInfo IE). The gNB also specifies the granularity of the SI broadcast: cell-level or SI area level.

For example, if an SI message is being broadcast in a given SI area, the identity of such area is specified as systemInformationAreaID in SI-SchedulingInfo IE. Furthermore, in support of msg1-based ODSI requests, the gNB specifies random access resources for ODSI in the IE si-RequestConfig for the normal uplink (NUL) and si-RequestConfigSUL for the supplementary uplink (SUL).

In Step F10S4, the gNB checks if there is a Msg1-/Msg3-based ODSI request from the UE. If there is, the gNB goes to Step F10S5. Otherwise, the gNB goes to Step F10S6.

In Step F10S5, the gNB records the ODSI information in the UE-specific ODSI Report. In particular, the gNB records successful and failed ODSI attempts for the UE. The gNB also records the ODSI configuration (e.g., RA configuration and SUL/NUL configuration in the IEs "si-RequestConfigSUL" and "SI-RequestConfig").

In Step F10S6, the gNB checks if there is an ODSI report availability indication from the UE. If there is, the gNB goes to Step F10S7. Otherwise, the gNB goes to Step F10S3.

In Step F10S7, the gNB sends UEInformationRequest message to the UE to obtain the ODSI report from the UE.

In Step F10S8, the gNB checks if there is UEInformationResponse message from the UE. If there is, the gNB goes to Step F10S9. Otherwise, the gNB keeps checking for this response message.

In Step F10S9, the gNB sends the self-generated and UE-reported UE-specific ODSI report to the SON/MDT entity. The SON/MDT entity can then carry out ODSI optimization.

Figure 11:
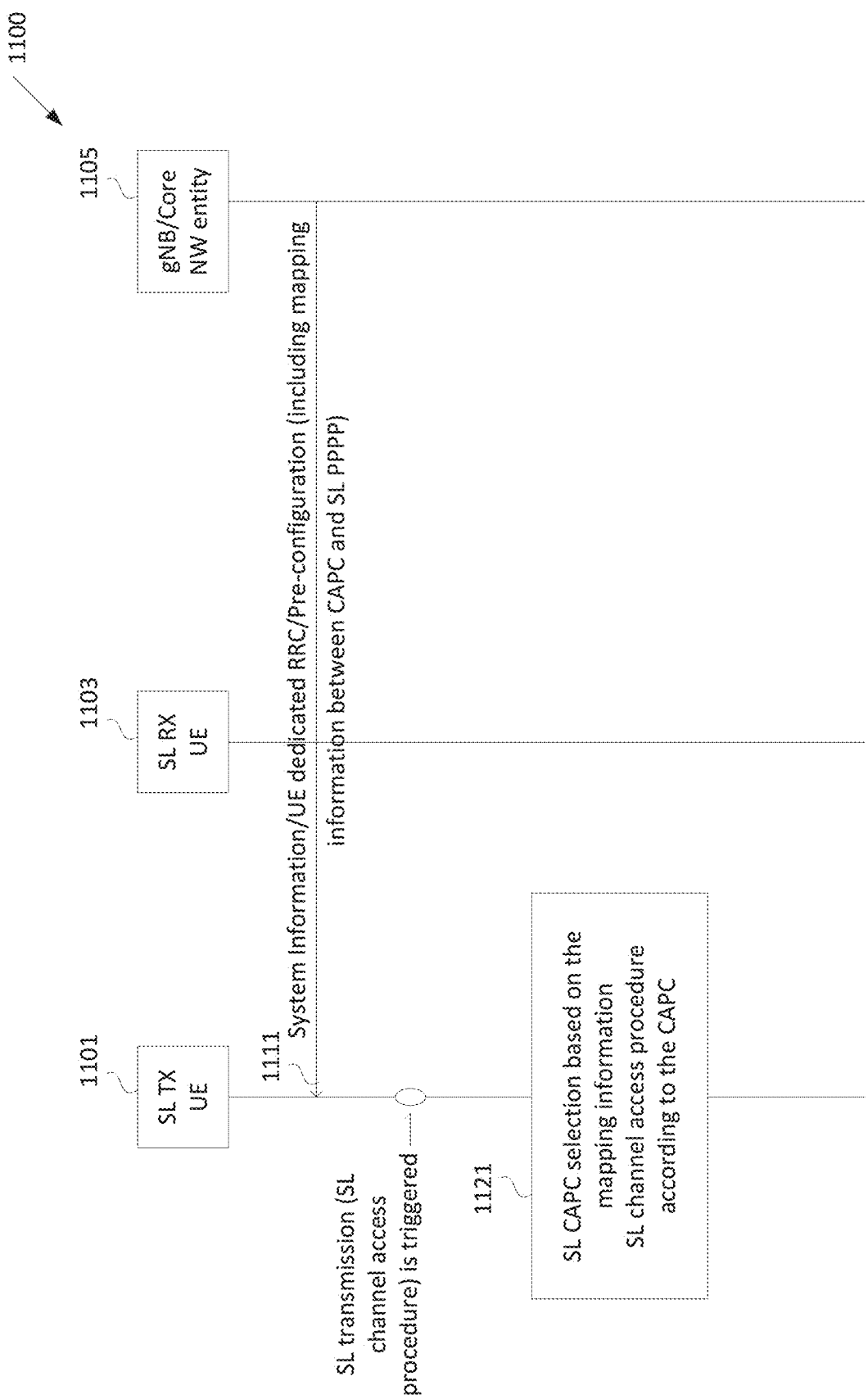
FIG. 11 illustrates a signaling flow between UEs and gNB according to various embodiments of the present disclosure.

FIG. 11 illustrates a signaling flow 1100 between UEs and gNB according to various embodiments of the present disclosure. The signaling flow 1100 between UEs and gNB as may be performed by a UE (e.g., 111-116 as illustrated in FIG. 1) and a BS (e.g., 101-103 as illustrated in FIG. 1. An embodiment of the signaling flow 1100 between UEs and gNB shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 illustrates one example of the overall signalling flows for the SL channel access procedure. Note here it is assumed CAPC-based SL channel access procedure, e.g., similar one as the channel access type 1 for DL/UL. an SL UE (e.g., 1101) is configured for an SL transmission. An SL UE (e.g., 1103) is configured for an SL reception, and the serving gNB or the other core network (NW) entity (e.g., 1105) is determined for the UE (e.g., 1101). Other core NW can be any of proximity-based services (ProSe) function, V2X CF, V2X PCF, or V2X application server, which is responsible for provisioning the UE with parameters for SL communication. Note the core NW provisioned parameters is also considered as pre-configuration parameters. In step 1111, a mapping information between CAPC and SL PPPP is (pre)-configured. For the gNB (e.g., 1105), the mapping information is configured via either system information or a UE dedicated RRC message (e.g., RRC connection reconfiguration). For the core NW entity (e.g., 1105), the mapping information is pre-configured. SL PPPP is the SL specific QoS handling in addition to the conventional Per-flow QoS model that has been used for NR DL and UL.

When the V2X/ProSe upper layer passes a protocol data unit for transmission to radio protocol L1/L2/L3, the V2X/ProSe upper layer also provides a PPPP from a range of 8 possible values. The PPPP is independent of the destination L2 ID and applies to both one-to-one and one-to-many SL communication. A PPPP value is also assigned to PC5-Signalling (PC5-S) messages. The radio protocol L1/L2/L3 uses the PPPP associated with the protocol data unit has received from the upper layers to prioritise the transmission in respect with other intra-UE transmissions (i.e., protocol data units associated with different priorities awaiting transmission inside the same UE) and inter-UE transmissions (i.e., protocol data units associated with different priorities awaiting transmission inside different UEs).

Priority queues (both intra-UE and inter-UE) are expected to be served in priority order i.e., UE serves all packets associated with ProSe Per-Packet Priority N before serving packets associated with priority N+1 (lower number meaning higher priority). Example of the mapping information is provided below. Note N, M, X, and Y are all integer values wherein $0<=N<=M<=X<=Y<=7$. In another example, N, M, X, and Y can be any value between 0 and 7:

CAPC #1 is mapped to PPPP #0 to PPPP #N;
CAPC #2 is mapped to PPPP #(N+1) to PPPP #M;
CAPC #3 is mapped to PPPP #(M+1) to PPPP #X; and/or
CAPC #4 is mapped to PPPP #(X+1) to PPPP #7 (or Y).

Once the UE (e.g., 1101) is (pre-) configured with the mapping information between CAPC and SL PPPP, if an SL transmission over unlicensed band (U-band) is triggered (or SL channel access procedure over U-band is triggered), the UE performs SL CAPC selection based on this mapping information and the lowest PPPP value corresponding to SL MAC SDU(s) and/or SL MAC CE(s) in a SL MAC PDU (or in a SL TB: transport block) to be transmitted. Note lower SL PPPP value means higher priority. For example, if the lowest SL PPPP value corresponding to SL MAC SDU(s) and/or SL MAC CE(s) in a SL MAC PDU to be transmitted is in the range between (N+1) to M, the UE selects CAPC #2 and accordingly the UE performs SL channel access procedure using $m_p$, $CW_{min,p}$, $CW_{max,p}$, $T_{mcot,p}$, and allowed $CW_p$ that correspond to the selected CAPC #2 (1121).

As another example, instead of mapping information between CAPC and SL PPPP, SL PPPP can be directly used to play a role of CAPC. In the case, direct mapping between SL PPPP value and the corresponding parameters/variables/constants value (or value ranges) is used in TABLE 6 and/or TABLE 7.

As another example, the mapping information between CAPC and SL logical channel priority value (e.g., sl-Priority-r16) can be used. In Rel-16 SL communication, each SL logical channel is (pre-)configured as shown in TABLE 1.

TABLE 1

SL-logical channel configuration

SL-LogicalChannelConfig-r16 ::=    SEQUENCE {
  sl-Priority-r16                  INTEGER (1..8),
  sl-PrioritisedBitRate-r16        ENUMERATED {kBps0, kBps8, kBps16, kBps32,
kBps64, kBps128, kBps256, kBps512, kBps1024, kBps2048, kBps4096, kBps8192,
kBps16384, kBps32768, kBps65536, infinity},
  sl-BucketSizeDuration-r16        ENUMERATED {ms5, ms10, ms20, ms50, ms100, TABLE 1-continued SL-logical channel configuration

```
ms150, ms300, ms500, ms1000, spare7, spare6, spare5, spare4, spare3,spare2, spare1},
    sl-ConfiguredGrantTypelAllowed-r16                    ENUMERATED {true}
OPTIONAL, -- NeedR
    sl-HARQ-FeedbackEnabled-r16          ENUMERATED {enabled, disabled }
OPTIONAL, -- NeedR
    sl-AllowedCG-List-r16             SEQUENCE (SIZE (0.. maxNrofCG-SL-r16-l))
OF SL-ConfigIndexCG-r16
OPTIONAL, -- NeedR
    sl-AllowedSCS-List-r16                  SEQUENCE (SIZE (1..maxSCSs)) OF
SubcarrierSpacing                     OPTIONAL, -- Need R
    sl-MaxPUSCH-Duration-r16               ENUMERATED {ms0p02,
ms0p04,
ms0p0625, ms0p125, msOp25, ms0p5, spare2, spare1}
OPTIONAL, -- NeedR
    sl-LogicalChannelGroup-r16                  INTEGER (0..maxLCG-ID)
OPTIONAL, -- NeedR
    sl-SchedulingRequestId-r16                       SchedulingRequestId
OPTIONAL, -- NeedR
    sl-LogicalChannelSR-DelayTimerApplied-r16             BOOLEAN
OPTIONAL, -- NeedR
    ...
}
```

As shown in TABLE 1, each SL logical channel is configured with a SL logical channel priority value. Example of the mapping information is provided below. Note N, M, X, and Y are all integer values wherein 1<=N<=M<=X<=Y<=8. In another example, N, M, X, and Y can be any value between 1 and 8:

CAPC #1 is mapped to SL logical channel priority value #1 to SL logical channel priority value #N;

CAPC #2 is mapped to SL logical channel priority value #(N+1) to SL logical channel priority value #M;

CAPC #3 is mapped to SL logical channel priority value #(M+1) to SL logical channel priority value #X; and/or CAPC #4 is mapped to SL logical channel priority value #(X+1) to SL logical channel priority value #8 (or Y).

Once a UE (e.g., 1101) is (pre-)configured with the mapping information between CAPC and SL logical channel priority value, if SL transmission over U-band is triggered (or SL channel access procedure over U-band is triggered), the UE performs SL CAPC selection based on this mapping information and the lowest SL logical channel priority value (based on the assumption lower SL logical channel priority value indicates higher priority. Otherwise, it may be the highest SL logical channel priority value based on the assumption higher SL logical channel priority value indicates higher priority) corresponding to the SL logical channel's MAC SDU(s) and/or SL MAC CE(s) in a SL MAC PDU (or in a SL TB: transport block) to be transmitted.

For example, if the lowest SL logical channel priority value corresponding to the SL logical channel's MAC SDU(s) and/or SL MAC CE(s) in a SL MAC PDU to be transmitted is in the range between (N+1) to M, the UE selects CAPC #2 and accordingly the UE performs SL channel access procedure using $m_p$, $CW_{min,p}$, $CW_{max,p}$, $T_{mcot,p}$, and allowed $CW_p$ that correspond to the selected CAPC #2 (e.g., 1121).

As another example, instead of mapping information between CAPC and SL logical channel priority value, SL logical channel priority can be directly used to play a role of CAPC. In the case, direct mapping between SL logical channel priority value and the corresponding parameters/variables/constants value (or value ranges) is used in TABLE 6 and/or TABLE 7.

Figure 12:
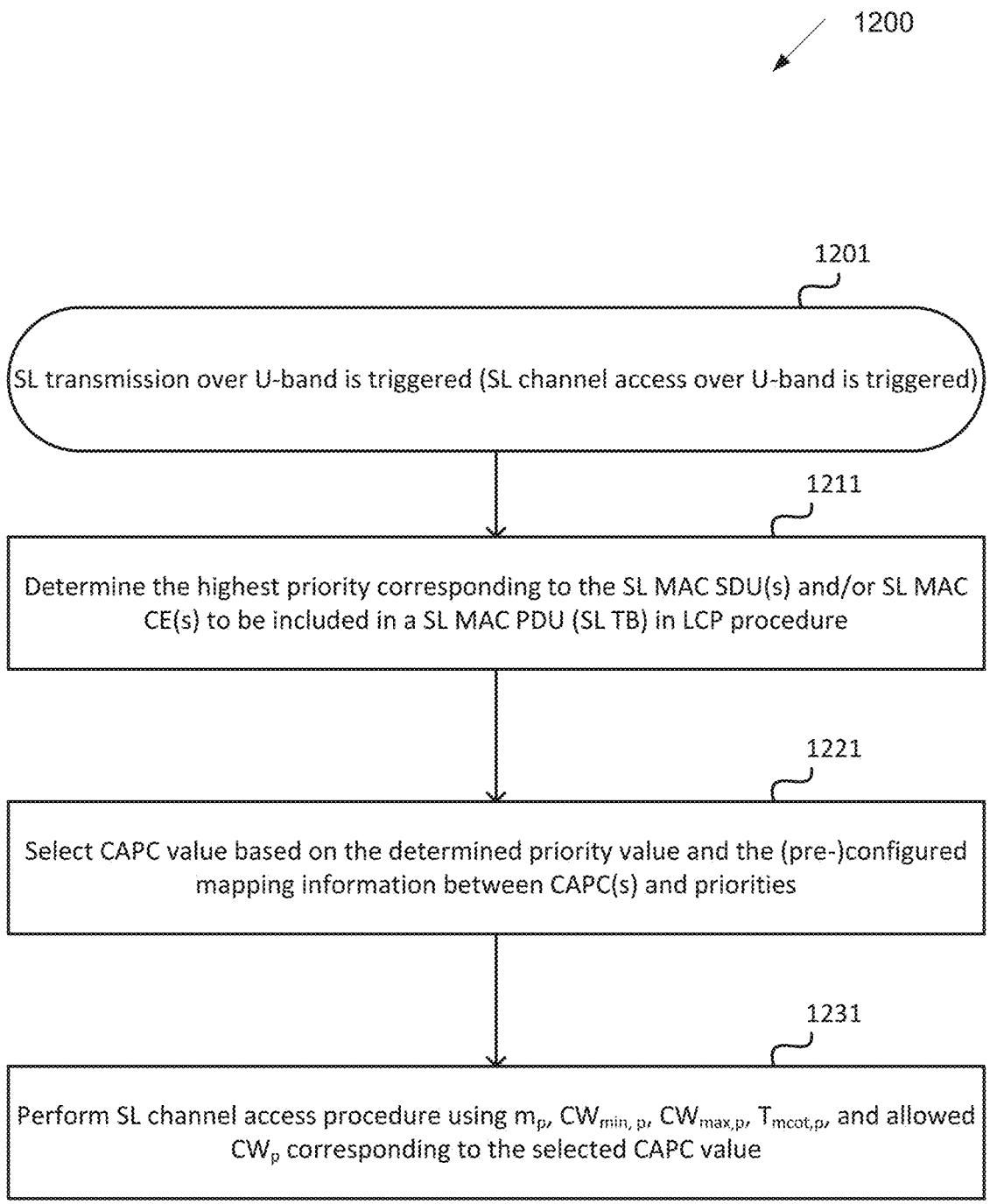
FIG. 12 illustrates a flowchart of UE procedure for SL channel access according to various embodiments of the present disclosure.

FIG. 12 illustrates a flowchart of UE procedure 1200 for SL channel access according to various embodiments of the present disclosure. The UE procedure 1200 as may be performed by a UE (e.g., 111-116 as illustrated in FIG. 1). An embodiment of UE procedure 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

FIG. 12 illustrates one example of UE (e.g., 1101) behaviors. Note that it is assumed the UE has already received (pre-)configured mapping information between CAPC(s) and SL PPPP(s) or SL logical channel priority values. In 801, SL transmission over U-band is triggered (or SL channel access procedure over U-band is triggered) in the UE.

As illustrated in FIG. 12, in step 1211, the UE determines a SL PPPP value or SL logical channel priority value for the highest priority corresponding to the SL MAC SDU(s) and/or SL MAC CE(s) to be included in a SL MAC PDU (or SL TB) in SL Logical Channel Prioritization (LCP) procedure in MAC sublayer. If SL PPPP is used, the highest priority means the lowest SL PPPP value corresponding to the SL MAC SDU(s) and/or SL MAC CE(s) to be included in a SL MAC PDU (or SL TB).

If the SL logical channel priority value is used, with the assumption lower SL logical channel priority value indicates higher priority, the highest priority means the lowest SL logical channel priority value corresponding to the SL MAC SDU(s) and/or SL MAC CE(s) to be included in a SL MAC PDU, otherwise with the assumption higher SL logical channel priority value indicates higher priority, the highest priority means the highest SL logical channel priority value corresponding to the SL MAC SDU(s) and/or SL MAC CE(s) to be included in a SL MAC PDU. Note the following captured Rel-16 SL LCP procedure in 3GPP standard specification as shown in TABLE 2.

TABLE 2

Multiplexing and assembly 5.22.1.4 Multiplexing and assembly
For PDU(s) associated with one SCI, MAC shall consider only logical channels with the
same Source Layer-2 ID-Destination Layer-2 ID pair for one of unicast, groupcast and
broadcast which is associated with the pair. Multiple transmissions for different sidelink
processes are allowed to be independently performed in different PSSCH durations.
5.22.1.4.1 Logical channel prioritization
5.22.1.4.1.1 General
The sidelink Logical Channel Prioritization procedure is applied whenever a new
transmission is performed.
RRC controls the scheduling of sidelink data by signalling for each logical channel:
sl-Priority where an increasing priority value indicates a lower priority level;
sl-PrioritisedBitRate which sets the sidelink Prioritized Bit Rate (sPBR);
sl-BucketSizeDuration which sets the sidelink Bucket Size Duration (sBSD).
RRC additionally controls the LCP procedure by configuring mapping restrictions for
each logical channel:
sl-configuredGrantTypelAllowed which sets whether a configured grant
Type 1 can be used for sidelink transmission;
sl-AllowedCG-List which sets the allowed configured grant(s) for sidelink
transmission;
sl-HARQ-FeedbackEnabled which sets whether the logical channel is
allowed to be multiplexed with logical channel(s) with sl-HARQ-FeedbackEnabled set
to enabled or disabled.
The following UE variable is used for the Logical channel prioritization procedure:
SBj which is maintained for each logical channel j.
The MAC entity shall initialize SBj of the logical channel to zero when the logical
channel is established.
For each logical channel j, the MAC entity shall:
1> increment SBj by the product sPBR x T before every instance of the LCP
procedure, where T is the time elapsed since SBj was last incremented;
1> if the value of SBj is greater than the sidelink bucket size (i.e., sPBR × sBSD):
2> set SBj to the sidelink bucket size.
NOTE: The exact moment(s) when the UE updates SBj between LCP procedures is
up to UE implementation, as long as SBj is up to date at the time when a grant is
processed by LCP.
5.22.1.4.1.2 Selection of logical channels
The MAC entity shall for each SCI corresponding to a new transmission:
1> select a Destination associated to one of unicast, groupcast and broadcast,
having at least one of the MAC CE and the logical channel with the highest priority,
among the logical channels that satisfy all the following conditions and MAC CE(s), if
any, for the SL grant associated to the SCI:
2> SL data is available for transmission; and
2> SBj > 0, in case there is any logical channel having SBj > 0; and
2> sl-configuredGrantTypelAllowed, if configured, is set to true in case the SL
grant is a Configured Grant Type 1; and
2> sl-AllowedCG-List, if configured, includes the configured grant index
associated to the SL grant; and
2> sl-HARQ-FeedbackEnabled is set to disabled, if PSFCH is not configured for
the SL grant associated to the SCI.
NOTE 1: If multiple Destinations have the logical channels satisfying all conditions
above with the same highest priority or if multiple Destinations have either the MAC CE
and/or the logical channels satisfying all conditions above with the same priority as the
MAC CE, which Destination is selected among them is up to UE implementation.
1> select the logical channels satisfying all the following conditions among the
logical channels belonging to the selected Destination:
2> SL data is available for transmission; and
2> sl-configuredGrantTypelAllowed, if configured, is set to true in case the SL
grant is a Configured Grant Type 1; and.
2> sl-AllowedCG-List, if configured, includes the configured grant index
associated to the SL grant; and
3> if PSFCH is configured for the sidelink grant associated to the SCI:
4> sl-HARQ-FeedbackEnabled is set to enabled, if sl-HARQ-FeedbackEnabled
is set to enabled for the highest priority logical channel satisfying the above conditions;
or
4> sl-HARQ-FeedbackEnabled is set to disabled, if sl-HARQ-FeedbackEnabled
is set to disabled for the highest priority logical channel satisfying the above conditions.
3> else:
4> sl-HARQ-FeedbackEnabled is set to disabled.
NOTE 2: sl-HARQ-FeedbackEnabled is set to disabled for the transmission of a MAC
PDU only carrying CSI reporting MAC CE.
5.22.1.4.1.3 Allocation of sidelink resources
The MAC entity shall for each SCI corresponding to a new transmission:
1> allocate resources to the logical channels as follows:
2> logical channels selected in clause 5.22.1.4.1.2 for the SL grant with SBj > 0
are allocated resources in a decreasing priority order. If the sPBR of a logical channel is
set to infinity, the MAC entity shall allocate resources for all the data that is available for
transmission on the logical channel before meeting the sPBR of the lower priority logical
channel(s);
2> decrement SBj by the total size of MAC SDUs served to logical channel j TABLE 2-continued Multiplexing and assembly above;
2> if any resources remain, all the logical channels selected in clause
5.22.1.4.1.2 are served in a strict decreasing priority order (regardless of the value of
SBj) until either the data for that logical channel or the SL grant is exhausted, whichever
comes first. Logical channels configured with equal priority be served equally.
NOTE: The value of SBj can be negative.
The UE shall also follow the rules below during the SL scheduling procedures above:
the UE should not segment an RLC SDU (or partially transmitted SDU or
retransmitted RLC PDU) if the whole SDU (or partially transmitted SDU or
retransmitted RLC PDU) fits into the remaining resources of the associated MAC entity;
if the UE segments an RLC SDU from the logical channel, the UE shall
maximize the size of the segment to fill the grant of the associated MAC entity as much
as possible;
the UE should maximise the transmission of data;
if the MAC entity is given a sidelink grant size that is equal to or larger than
12 bytes while having data available and allowed (according to clause 5.22.1.4.1) for
transmission, the MAC entity shall not transmit only padding;
A logical channel configured with sl-HARQ-FeedbackEnabled set to enabled
and a logical channel configured with sl-HARQ-FeedbackEnabled set to disabled cannot
be multiplexed into the same MAC PDU.
The MAC entity shall not generate a MAC PDU for the HARQ entity if the following
conditions are satisfied:
there is no Sidelink CSI Reporting MAC CE generated for this PSSCH
transmission as specified in clause 5.22.1.7; and
the MAC PDU includes zero MAC SDUs.
Logical channels shall be prioritised in accordance with the following order (highest
priority listed first):
data from SCCH;
Sidelink CSI Reporting MAC CE;
data from any STCH.
5.22.1.4.2 Multiplexing of MAC Control Elements and MAC SDUs
The MAC entity shall multiplex a MAC CE and MAC SDUs in a MAC PDU according
to clauses 5.22.1.4.1 and 6.1.6.

In step 1221, the UE selects CAPC value based on the determined priority value (determined SL PPPP value or SL logical channel priority value) and the (pre-)configured mapping information between CAPC(s) and priorities (SL PPPPs or SL logical channel priorities). In 1231, the UE performs SL channel access procedure using $m_p$, $CW_{min,p}$, $CW_{max,p}$, $T_{mcot,p}$, and allowed $CW_p$ corresponding to the selected CAPC value.

As another example to determine CAPC in SL channel access procedure, the combination of the mechanism used for DL/UL over U-band and the described mechanism in the FIG. 11 and FIG. 12 can be used. For example, fixed mapping table between CAPC and (some) standardized PC5 5QIs (PQIs) is defined and the described mechanism in FIG. 11 and FIG. 12 is used for other PQIs that are not defined in the mapping table. A PQI is a special 5QI, as defined in TS 23.501, and is used as a reference to PC5 QoS characteristics and parameters. Standardized PQI values have one-to-one mapping to a standardized combination of PC5 QoS characteristics.

The TABLE 3 shows Rel-16 standardized PQI values and the corresponding QoS characteristics.

TABLE 3

Rel-16 standardized PQI to QoS characteristics mapping

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 21 | GBR | 3 | 20 ms | $10^{-4}$ | N/A | 2000 ms | Platooning between UEs—Higher degree of automation; Platooning between UE and RSU—Higher degree of automation |
| 22 | (NOTE 1) | 4 | 50 ms | $10^{-2}$ | N/A | 2000 ms | Sensor sharing—higher degree of automation |
| 23 | | 3 | 100 ms | $10^{-4}$ | N/A | 2000 ms | Information sharing for automated driving—between UEs or UE and RSU—higher degree of automation |
| 55 | Non-GBR | 3 | 10 ms | $10^{-4}$ | N/A | N/A | Cooperative lane change—higher degree of automation |

TABLE 3-continued

Rel-16 standardized PQI to QoS characteristics mapping

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 56 | | 6 | 20 ms | $10^{-1}$ | N/A | N/A | Platooning informative exchange—low degree of automation; Platooning—information sharing with RSU |
| 57 | | 5 | 25 ms | $10^{-1}$ | N/A | N/A | Cooperative lane change—lower degree of automation |
| 58 | | 4 | 100 ms | $10^{-2}$ | N/A | N/A | Sensor information sharing—lower degree of automation |
| 59 | | 6 | 500 ms | $10^{-1}$ | N/A | N/A | Platooning—reporting to an RSU |
| 90 | Delay GBR (NOTE 1) | 3 | 10 ms | $10^{-4}$ | 2000 bytes | 2000 ms | Cooperative collision avoidance; Sensor sharing—Higher degree of automation; Video sharing—higher degree of automation |
| 91 | Critical | 2 | 3 ms | $10^{-5}$ | 2000 bytes | 2000 ms | Emergency trajectory alignment; Sensor sharing—Higher degree of automation |

NOTE:
GBR and Delay Critical GBR PQIs can only be used for unicast PC5 communications.

In more details, SL Data radio bearer (DRB) is (pre-)configured by system information, a UE dedicated RRC message, or pre-configuration are as shown in TABLE 4.

TABLE 4

SL radio bearer configuration

```
SL-RadioBearerConfig-r16 ::=    SEQUENCE {
   slrb-Uu-ConfigIndex-r16       SLRB-Uu-ConfigIndex-r16,
   sl-SDAP-Config-r16            SL-SDAP-Config-r16
OPTIONAL, -- Cond SLRBSetup
   sl-PDCP-Config-r16            SL-PDCP-Config-r 16
OPTIONAL, -- Cond SLRBSetup
   sl-TransRange-r16             ENUMERATED {m20, m50, m80, m100, m120, m150,
m180, m200, m220, m250, m270, m300, m350, m370, m400, m420, m450, m480,
m500, m550, m600, m700, m1000, spare9, spare8, spare7, spare6,
spare5, spare4, spare3, spare2, spare1}
OPTIONAL, -- Need R
   ...
}
```

In SL-RadioBearerConfig-r16, an additional configuration may be added to set the corresponding CAPC value taking into account the PQIs of all the QoS flows multiplexed in this SL DRB. It may be assumed that the fixed mapping table between CAPC and (some) standardized PQI(s) is defined as shown in TABLE 5.

TABLE 5

Example of fixed mapping table between CAPC and PQI(s)

| CAPC | PQI |
|---|---|
| 1 | 91 |
| 2 | 21, 23, 55, 90 |
| 3 | — |
| 4 | — |

NOTE:
lower CAPC value means higher priority

Figure 13:
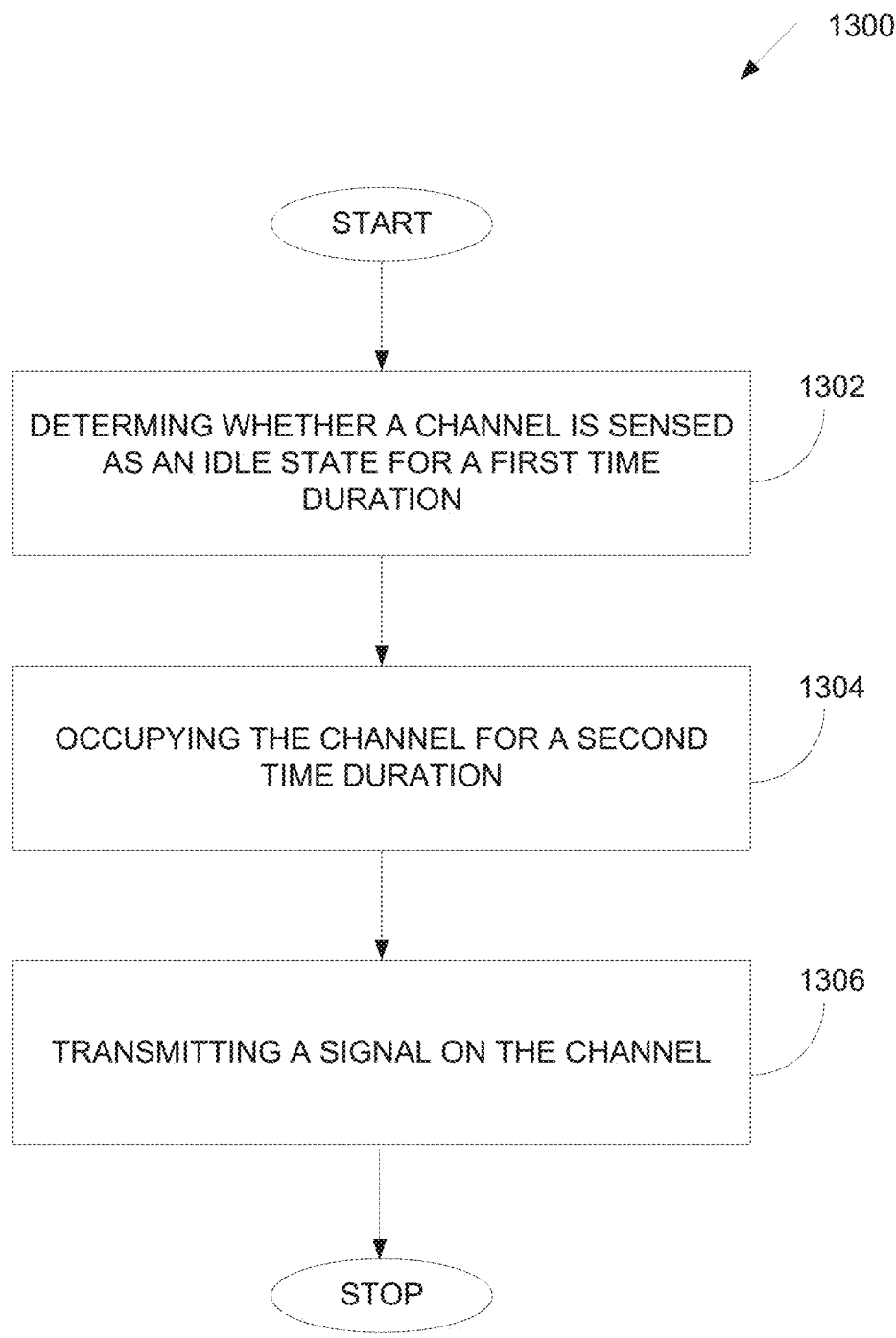
FIG. 13 illustrates a flowchart of UE method for a channel access according to various embodiments of the present disclosure.

For example, if SL DRB #1 multiplexes all QoS flows with PQI 21, 23, 55 and 90, CAPC value "2" can be additionally (pre-)configured for the SL-RadioBearerConfig-r16 corresponding to SL DRB #1. Then the UE always selects CAPC value "2" when the SL data is transmitted over SL DRB #1. However, for SL DRB(s) that does not include the additional configuration (CAPC value), the UE applies the mechanism described in FIG. 11 and FIG. 12 when the SL data is transmitted over that SL DRB(s). If SL data is transmitted over both kinds of SL DRBs at the same time, the UE selects the lowest CAPC value. Once the UE selects CAPC value, the UE performs SL channel access procedure using $m_p$, $CW_{min,p}$, $CW_{max,p}$, $T_{mcot,p}$, and allowed $CW_p$ corresponding to the selected CAPC value FIG. 13 illustrates a flowchart of UE method 1300 for a channel access according to various embodiments of the present disclosure. The UE method 1300 as may be performed by a UE (e.g., 111-116 as illustrated in FIG. 1). An embodiment of the UE method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, a method 1300 begins at step 1302. In step 1302, the UE determines whether, for a first time duration, a channel is sensed as an idle state for a channel access procedure.

Subsequently, in step 1304, the UE occupies the channel for a second time duration based on a determination that the channel is sensed as the idle state.

Finally, in step 1306, the UE transmits, for at least a portion of the second time duration, a signal on the channel. In step 1306, the first time duration and the second time duration are based on a SL PPPP for a SL communication.

In one embodiment, the UE identifies channel access priority based on first mapping information between a CAPC and the SL PPPP.

In one embodiment, the UE determines the first time duration and the second time duration based on the channel access priority.

In one embodiment, the UE receives, from a BS, the first mapping information via system information or a UE dedicated RRC message or identifies the first mapping information that is pre-configured as a system parameter.

In one embodiment, the UE selects the SL PPPP with a lowest value among a plurality of SL PPPPs corresponding to SL data or SL MAC CEs to be transmitted and determine the SL PPPP with the lowest value as a channel access priority for transmitting the SL data or the SL MAC CEs.

In one embodiment, the UE identifies a channel access priority based on second mapping information between a CAPC and an SL logical channel priority and determines the first time duration and the second time duration based on the channel access priority.

In one embodiment, the UE receives, from a BS, the second mapping information via system information or a UE dedicated RRC message or identifies the second mapping information that is pre-configured as a system parameter.

In one embodiment, the UE selects a SL logical channel with a lowest value among a plurality of SL logical channels corresponding to SL data or SL MAC CEs to be transmitted and determines the SL logical channel with the lowest value as a channel access priority for transmitting the SL data or the SL MAC CEs.

In one embodiment, the UE identifies a channel access priority based on second mapping information between a CAPC and a PQI of SL logical channel and identifies the first time duration and the second time duration based on the channel access priority.

In one embodiment, the UE selects the CAPC with a lowest value among a plurality of CAPCs corresponding to SL data or SL MAC CEs to be transmitted and determines the CAPC with the lowest value as a channel access priority for transmitting the SL data or SL MAC CEs.

Figure 14:
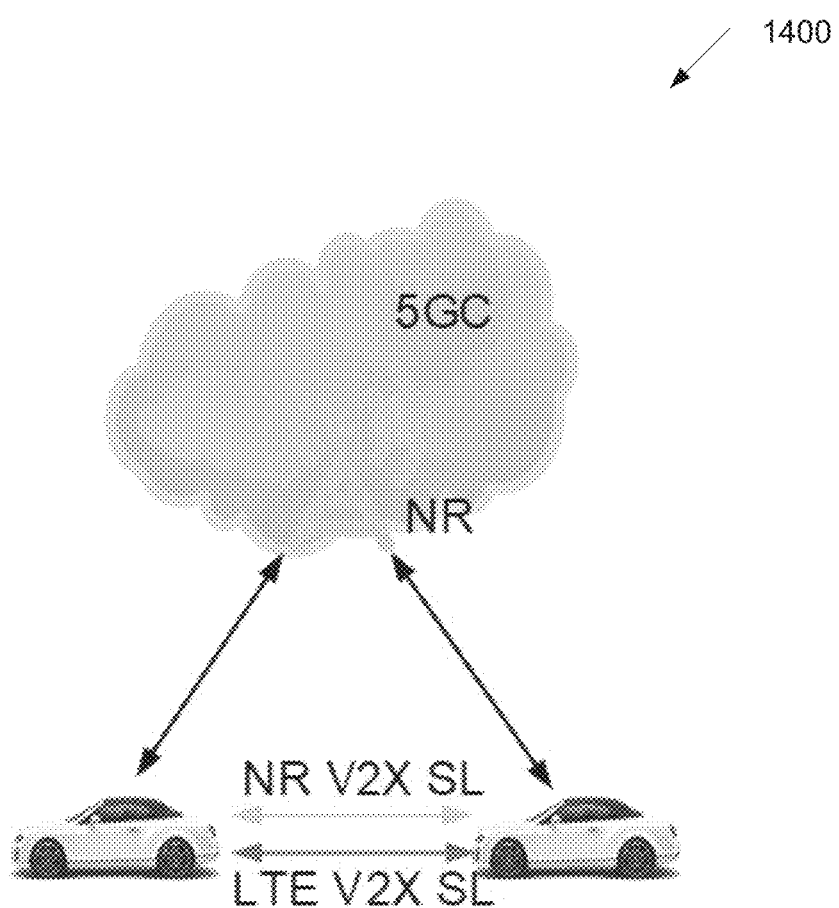
FIG. 14 illustrates an example of V2X communication over SL according to various embodiments of the present disclosure.

FIG. 14 illustrates an example of V2X communication over SL 1400 according to various embodiments of the present disclosure. An embodiment of the V2X communication over SL 1400 shown in FIG. 14 is for illustration only.

In 3GPP (3rd Generation Partnership Project) wireless standards, NR (New RAT: Radio Access Technology) has been specified as 5G wireless communication. One of NR features is V2X (Vehicle-to-Everything). FIG. 14 illustrates the example scenario of vehicle to vehicle communication. Two or multiple vehicles can transmit and receive data/control over direct link/interface between vehicles. The direct link/interface between vehicles or between vehicle and other things is named as SL (Sidelink) in 3GPP, so "SL communication" is also commonly used instead of "V2X communication". Note the FIG. 14 illustrates the scenario where the vehicles still can communicate with gNB in order to acquire SL resource, SL radio bearer configurations, etc., however it is also possible even without interaction with gNB, vehicles still communicate each other over SL. In the case, SL resource, SL radio bearer configuration, etc. are preconfigured (e.g., via V2X server or any other core network entity).

For more detailed V2X scenarios and studies were captured in [5]. One of main difference compared to UL (Uplink: link from the UE to the gNB) is the resource allocation mechanism for transmission. In UL, the resource for transmission is allocated by the gNB, however in SL, the UE itself selects a resource within the SL resource pool, which is configured by the gNB and selected by the UE if multiple SL resource pools are configured, based on UE's channel sensing result and the required amount of resources for data/control transmission. The details of SL resource selection are specified in 3GPP standard specifications.

Figure 15A:
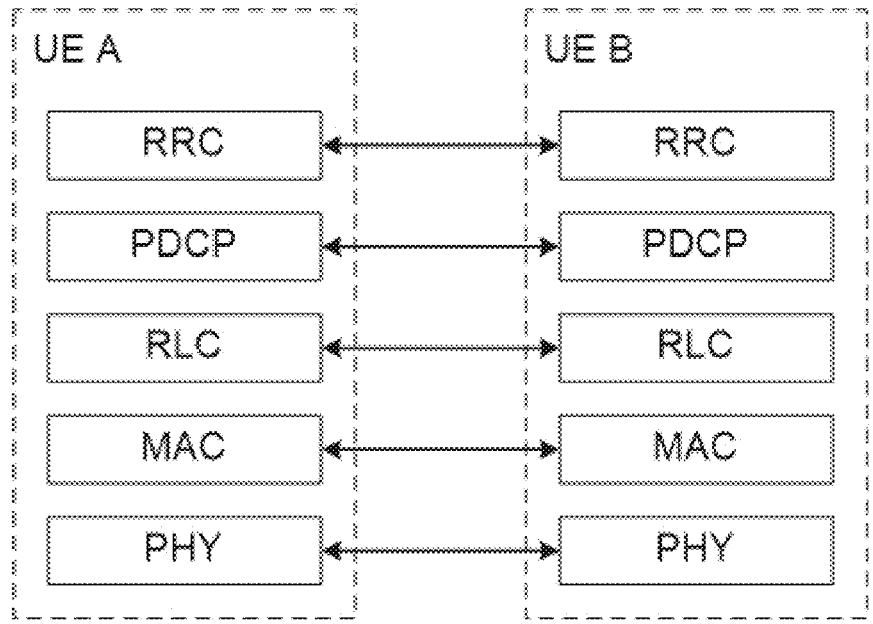
FIG. 15A illustrates an example of SL control plane radio protocol stack according to various embodiments of the present disclosure.

FIG. 15A illustrates an example of SL control plane radio protocol stack 1500 according to various embodiments of the present disclosure. An embodiment of the SL control plane radio protocol stack 1500 shown in FIG. 15A is for illustration only.

Figure 15B:
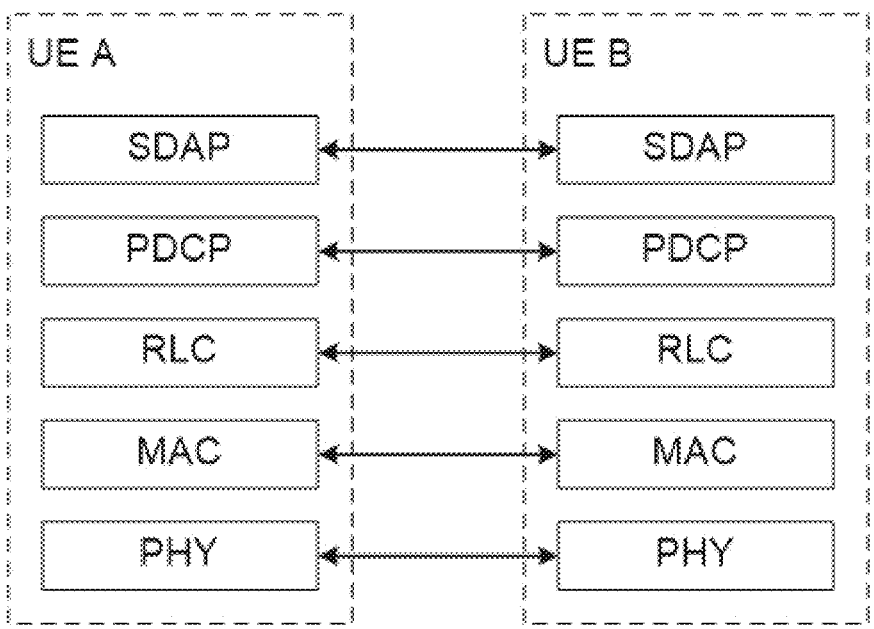
FIG. 15B illustrates an example of SL user plane radio protocol stack according to various embodiments of the present disclosure.

For SL communication, the radio interface L1/L2/L3 (Layer 1/Layer 2/Layer 3) protocols consist of PHY (Physical protocol, which specified in 3GPP standards TS 38.211, 38.212, 38.213, 38.214, and 38.215), MAC (Medium Access Control, which specified in 3GPP standards TS 38.321), RLC (Radio Link Control, which specified in 3GPP standards TS 38.322), PDCP (Packet Data Convergence Protocol, which specified in 3GPP standards TS 38.323), RRC (Radio Resource Control, which specified in 3GPP standards TS 38.331) and SDAP (Service Data Adaptation Protocol, which specified in 3GPP standards TS 37.324). FIG. 15A and FIG. 15B describe the example of SL control plane radio protocol stack (for SL-RRC) and SL user plane data radio protocol stack for NR SL communication.

FIG. 15B illustrates an example of SL user plane radio protocol stack 1550 according to various embodiments of the present disclosure. An embodiment of the SL user plane radio protocol stack 1550 shown in FIG. 15B is for illustration only.

Figure 16:
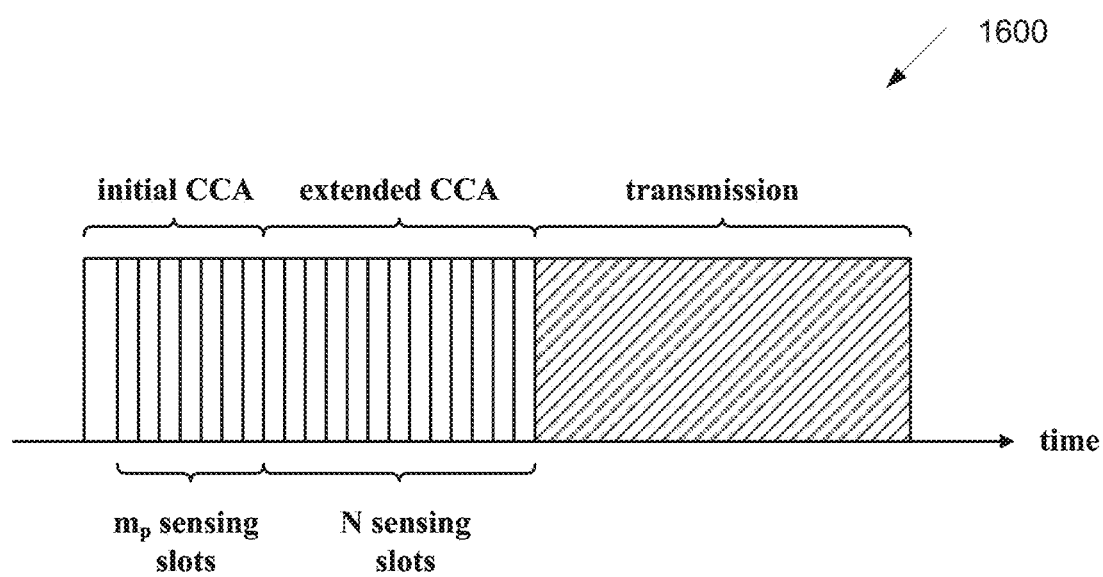
FIG. 16 illustrates an example of Type 1 DL/UL channel access procedure according to various embodiments of the present disclosure.

FIG. 16 illustrates an example of Type 1 DL/UL channel access procedure 1600 according to various embodiments of the present disclosure. An embodiment of the Type 1 DL/UL channel access procedure 1600 shown in FIG. 16 is for illustration only.

Physical protocol layer handles physical layer signals/channels and physical layer procedures (e.g., physical layer channel structures, physical layer signal encoding/decoding, SL power control procedure, SL CSI (Channel Status Information) related procedure). Main physical SL channels and signals are defined as follow: (1) physical sidelink control channel (PSCCH) indicates resource and other transmission parameters used by a UE for PSSCH; (2) physical sidelink shared channel (PSSCH) transmits the TBs of data themselves and CSI feedback information, etc.; (3) physical sidelink feedback channel (PSFCH) transmits HARQ feedback over the sidelink from a UE which is an intended recipient of a PSSCH transmission to the UE which performed the transmission; (4) sidelink synchronization signal includes sidelink primary and sidelink secondary synchronization signals (S-PSS, S-SSS); and (5) physical sidelink broadcast channel (PSBCH) indicates the required essential system information for SL operations.

A MAC protocol layer performs packet filtering (e.g., determine whether the received packet is actually destined to the UE (based on the L2 source and destination ids in the MAC header), SL carrier/resource pool/resource within the resource pool (re)selection, priority handling between SL and UL (Uplink) for a given UE, SL logical channel prioritization, the corresponding packet multiplexing (e.g., multiplexing multiple MAC SDUs into a given MAC PDU) and SL HARQ retransmissions/receptions.

An RLC protocol layer performs RLC SDU segmentation/SDU reassembly, re-segmentation of RLC SDU segments, error correction through ARQ (only for AM data transfer). PDCP protocol layer performs header compression/decompression, ciphering and/or integrity protection, duplication detection, re-ordering and in-order packet delivery to the upper layer and out-of-order packet delivery to the upper layer.

An RRC protocol layer performs transfer of a SL-RRC message, which is also named as PC5-RRC (PC5 indicates the reference point between UEs for SL communication), between peer UEs, maintenance and release of SL-RRC connection between two UEs, and detection of SL radio link failure for a SL-RRC connection.

An SDAP protocol layer performs mapping between a QoS (Quality of Service) flow and a SL data radio bearer. Note we use the term of SL-RRC or PC5-RRC in the document.

Another NR features is NR on unlicensed spectrum (NR-U), which was introduced in Rel-16. A node (gNB or UE) can initialize a channel occupancy on an operating channel after performing a channel access procedure, wherein the channel access procedure includes at least one sensing slot and the sensing is based on energy detection.

In particular, for a single carrier channel access with dynamic channel access (or load-based-equipment (LBE) mode), a gNB can initialize a channel occupancy after performing the Type 1 DL channel access procedure, and a UE can initialize a channel occupancy after performing the Type 1 UL channel access procedure. In the Type 1 DL/UL channel access procedure, the time duration spanned by the sensing slots that are sensed to be idle before a transmission is random, and the time duration include a first period (e.g. initial CCA period) consisting of a duration of 16 us and a fixed number (e.g. $m_p$) of sensing slots, and a second period (e.g. extended CCA period) consisting of a random number (e.g. N) of sensing slots, wherein $m_p$ is determined based on the channel access priority class (CAPC) p, and a length of the sensing slot is 9 us, for 5 GHz and 6 GHz unlicensed spectrum. The random number N is an integer generated uniformly between 0 and $CW_p$, and $CW_p$ is adjusted between a minimum value $CW_{min,p}$ and a maximum value $CW_{max,p}$, according to the CAPC as well. After the Type 1 DL/UL channel access procedure, the node can occupy the channel for a maximum duration $T_{mcot,p}$, which is also based on the CAPC. In Rel-16 NR-U, 4 CAPCs are supported, and the mapping between CAPC (e.g., p) and its associated $m_p$, $CW_{min,p}$, $CW_{max,p}$, $T_{mcot,p}$, and allowed values of $CW_p$ for DL and UL transmissions are shown in TABLE 6 and TABLE 7, respectively. TABLE 8 below shows which CAPC should be used for which standardized 5QIs i.e., which CAPC to use for a given QoS flow.

TABLE 6

Channel access priority class for DL

| CAPC (p) | $m_p$ | $CW_{min,p}$ | $CW_{max,p}$ | $T_{mcot,p}$ (ms) | allowed $CW_p$ |
|---|---|---|---|---|---|
| 1 | 1 | 3 | 7 | 2 | {3, 7} |
| 2 | 1 | 7 | 15 | 3 | {7, 15} |
| 3 | 3 | 15 | 63 | 8 or 10 | {15, 31, 63} |
| 4 | 7 | 15 | 1023 | 8 or 10 | {15, 31, 63, 127, 255, 511, 1023} |

TABLE 7

Channel access priority class for UL

| CAPC (p) | $m_p$ | $CW_{min,p}$ | $CW_{max,p}$ | $T_{mcot,p}$ (ms) | allowed $CW_p$ |
|---|---|---|---|---|---|
| 1 | 1 | 3 | 7 | 2 | {3, 7} |
| 2 | 1 | 7 | 15 | 3 | {7, 15} |
| 3 | 3 | 15 | 1023 | 6 or 10 | {15, 31, 63, 127, 255, 511, 1023} |
| 4 | 7 | 15 | 1023 | 6 or 10 | {15, 31, 63, 127, 255, 511, 1023} |

TABLE 8

Mapping between Channel Access Priority Classes and 5QI

| CAPC | 5QI |
|---|---|
| 1 | 1, 3, 5, 65, 66, 67, 69, 70, 79, 80, 82, 83, 84, 85 |
| 2 | 2, 7, 71 |
| 3 | 4, 6, 8, 9, 72, 73, 74, 76 |
| 4 | — |

NOTE:
lower CAPC value means higher priority —

A gNB can share its initialized channel occupancy (CO) with its serving UE(s), wherein the gNB indicates the type of channel access procedure for the UE(s) according to the gap between the DL and UL transmission.

For one example, the CO only includes one switching point between DL and UL transmissions, such that the CO starts with gNB's downlink transmission and proceeds with UE(s)' UL transmission, with a potential gap between the DL and UL transmission. For this example, the gNB can indicate the UE a type of channel access procedure based on the duration of the gap.

In one example of UL-LBT-1, if the gap is up to 16 us, the gNB can indicate the UE a Type 2C UL channel access procedure, wherein the time duration of sensing before the transmission is 0, and the maximum UL transmission duration subject to this type of channel access procedure is 584 us.

In one example of UL-LBT-2, if the gap is 16 us, the gNB can indicate the UE a Type 2B UL channel access procedure, wherein the time duration including the sensing slot(s) that are sensed to be idle before a transmission is 16 us.

In one example of UL-LBT-3, if the gap is larger or equals to 25 us, the gNB can indicate the UE a Type 2A UL channel access procedure, wherein the time duration including the sensing slot(s) that are sensed to be idle before a transmission is 25 us.

For another example, the CO can include multiple switching points between DL and UL transmissions, wherein the gap between any transmissions is no larger than 25 us. For this example, the gNB can perform a type of channel access procedure based on the duration of the gap between a UL transmission and a DL transmission.

In one example of DL-LBT-1, if the gap is up to 16 us, the gNB can perform a Type 2C DL channel access procedure, wherein the time duration of sensing before the transmission is 0, and the maximum DL transmission duration subject to this type of channel access procedure is 584 us.

In one example of DL-LBT-2, if the gap is 16 us, the gNB can perform a Type 2B DL channel access procedure, wherein the time duration including the sensing slot(s) that are sensed to be idle before a transmission is 16 us.

In one example of DL-LBT-3, if the gap is 25 us, the gNB can perform a Type 2A DL channel access procedure, wherein the time duration including the sensing slot(s) that are sensed to be idle before a transmission is 25 us.

Moreover, the gNB can indicate the UE a type of channel access procedure based on the duration of the gap, according to one of Example UL-LBT-1, Example UL-LBT-2, or Example UL-LBT-3.

A UE can also share its initialized channel occupancy (CO) with the gNB, wherein the gNB can determine the type of channel access procedure according to the gap between the UL and DL transmission. In Rel-16 NR-U, only single switching point between the UL transmission and DL transmission is allowed, and the gNB's DL transmission shall contain transmission to the UE initializes the CO and can further include non-unicast and/or unicast transmissions where any unicast transmission is only transmitted to the UE initializes the CO. For this example, the gap between the UL and DL transmission cannot exceed 25 us, and the gNB can perform a type of channel access procedure based on the duration of the gap, according to one of Example DL-LBT-1, Example DL-LBT-2, or Example DL-LBT-3.

In 3GPP Rel-18, it is planned to introduce more enhanced features into SL communication and one of the candidate features is to enable SL communication in unlicensed band that can be shared with other RAT, e.g., WiFi, Bluetooth, etc. We may assume the similar channel access procedure that was used for DL/UL into SL communication, however it may not be used as it is due to different characteristics of SL communication. Thus this invention proposes the enhanced channel access procedure for SL (we call SL channel access procedure).

The above flowcharts and signaling flow diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) in a wireless communication system, the method comprising:
   transmitting, to a base station, a request for on demand system information (ODSI);
   setting a first field associated with a system information block (SIB) in response to transmitting the request for the ODSI, wherein the SIB is requested by the UE to be received;
   receiving, from the base station, a UE information request message requesting an ODSI report from the UE;
   transmitting, to the base station, a UE information response message including the first field in response to receiving the UE information request message and the ODSI report requested from the base station; and
   acquiring the ODSI from the base station, wherein the acquiring indicates a successful request for the ODSI and wherein the UE information response message includes a second field associated with the successful request for the ODSI.

2. The method of claim 1, wherein the first field is not set to a system information block 1 (SIB1).

3. The method of claim 1, further comprising:
   receiving, from the base station, a UE capability enquiry message; and
   transmitting, to the base station, UE capability information associated with reporting a delivery of ODSI information.

4. The method of claim 1, further comprising:
   receiving, from the base station, a system information block 1 (SIB1) including first information for a system information broadcast status and second information for a type of the SIB that is contained in a system information (SI) message.

5. A method performed by a base station in a wireless communication system, the method comprising:
   receiving, from a user equipment (UE), a request for on demand system information (ODSI);
   transmitting, to the UE, a UE information request message requesting an ODSI report from the UE; and
   receiving, from the UE, a UE information response message including a first field associated with a system information block (SIB) in response to transmitting the UE information request message and the ODSI report requested from the base station,
   wherein the ODSI is acquired from the base station which indicates a successful request for the ODSI, and
   wherein the UE information response message includes a second field associated with the successful request for the ODSI.

6. The method of claim 5, wherein the first field is not set to a system information block 1 (SIB1).

7. The method of claim 5, further comprising:
   transmitting, to the UE, a UE capability enquiry message; and
   receiving, from the UE, UE capability information associated with reporting a delivery of ODSI information.

8. The method of claim 5, further comprising:
transmitting, to the UE, a system information block 1 (SIB 1) including first information for a system information broadcast status and second information for a type of the SIB that is contained in a system information (SI) message.

9. A user equipment (UE) in a wireless communication system, the UE comprising:
a transceiver configured to transmit, to a base station, a request for on demand system information (ODSI); and
a processor operably coupled to the transceiver, the processor configured to set a first field associated with a system information block (SIB) in response to transmitting result of the request for the ODSI, wherein the SIB is requested by the UE to be received;
wherein the transceiver is further configured to:
receive, from the base station, a UE information request message requesting an ODSI report from the UE;
transmit, to the base station, a UE information response message including the first field in response to receiving the UE information request message and the ODSI report requested from the base station;
acquire the ODSI from the base station, which indicates a successful request for the ODSI, wherein the UE information response message includes a second field associated with the successful request for the ODSI.

10. The UE of claim 9, wherein the first field is not set to a system information block 1 (SIB1).

11. The UE of claim 9, wherein the transceiver is further configured to:
receive, from the base station, a UE capability enquiry message, and
transmit, to the base station, UE capability information associated with reporting a delivery of ODSI information.

12. The UE of claim 9, wherein the transceiver is further configured to receive, from the base station, a system information block 1 (SIB 1) including first information for a system information broadcast status and second information for a type of the SIB that is contained in a system information (SI) message.

13. A base station in a wireless communication system, the base station comprising:
a processor; and
a transceiver operably coupled to the processor, the transceiver configured to:
receive, from a user equipment (UE), a request for on demand system information (ODSI),
transmit, to the UE, a UE information request message requesting an ODSI report from the UE, and
receive, from the UE, a UE information response message including a first field associated with a system information block (SIB) in response to transmitting the UE information request message and the ODSI report requested from the base station,
wherein the ODSI is acquired from the base station which indicates a successful request for the ODSI, and
wherein the UE information response message includes a second field associated with the successful request for the ODSI.

14. The base station of claim 13, wherein the first field is not set to a system information block 1 (SIB1).

15. The base station of claim 13, wherein the transceiver is further configured to:
transmit, to the UE, a UE capability enquiry message; and
receive, from the UE, a UE capability information associated with reporting a delivery of ODSI information.

16. The base station of claim 13, wherein the transceiver is further configured to transmit, to the UE, a system information block 1 (SIB1) including first information for a system information broadcast status and second information for a type of the SIB that is contained in a system information (SI) message.

* * * * *